(12) United States Patent
Shibasaki et al.

(10) Patent No.: US 6,681,165 B2
(45) Date of Patent: Jan. 20, 2004

(54) CONTROL DEVICE FOR ELECTRIC POWER STEERING APPARATUS

(75) Inventors: Kenichi Shibasaki, Maebashi (JP); Shuji Endo, Maebashi (JP)

(73) Assignee: NSK Ltd., Tokyo (JP)

( * ) Notice: Subject to any disclaimer, the term of this patent is extended or adjusted under 35 U.S.C. 154(b) by 125 days.

(21) Appl. No.: 09/961,284

(22) Filed: Sep. 25, 2001

(65) Prior Publication Data

US 2002/0056587 A1 May 16, 2002

(30) Foreign Application Priority Data

Sep. 25, 2000 (JP) ........................................ 2000-290166

(51) Int. Cl.$^7$ .............................................. B62D 5/04
(52) U.S. Cl. ............................ 701/41; 701/42; 180/443; 180/446
(58) Field of Search ..................... 701/41, 42; 180/443, 180/446

(56) References Cited

U.S. PATENT DOCUMENTS

| | | | | |
|---|---|---|---|---|
| 4,685,528 A | * | 8/1987 | Suzuki et al. | 180/446 |
| 4,753,309 A | * | 6/1988 | Marumoto et al. | 180/446 |
| 5,258,938 A | * | 11/1993 | Akamatsu | 708/290 |
| 5,473,539 A | * | 12/1995 | Shimizu et al. | 180/446 |
| 5,732,373 A | * | 3/1998 | Endo | 180/443 |
| 5,752,209 A | * | 5/1998 | Nishimoto et al. | 180/446 |
| 5,861,725 A | * | 1/1999 | Endo et al. | 180/446 |
| 6,116,372 A | * | 9/2000 | Mukai et al. | 180/443 |
| 6,134,490 A | * | 10/2000 | Ito et al. | 180/443 |
| 6,282,472 B1 | * | 8/2001 | Jones et al. | 180/443 |
| 6,373,535 B1 | * | 4/2002 | Shim et al. | 315/368.13 |
| 6,381,554 B1 | * | 4/2002 | Matsuo et al. | 702/174 |

FOREIGN PATENT DOCUMENTS

| | | |
|---|---|---|
| JP | 5-10271 | 2/1993 |
| JP | 8-150954 | 6/1996 |
| JP | 10-59203 | 3/1998 |
| JP | 2000-154284 | 5/2000 |
| JP | 2000-159128 | 6/2000 |

OTHER PUBLICATIONS

English language Abstract 2000–154284, May 25, 2000.
English language Abstract 5 (1993)–10271, Feb. 9, 1993.
English Language Abstract 5 (1996)–150954, Jun. 11, 1996.
English Language Abstract 10 (1998)–59203, Mar. 3, 1998.
English language Abstract 2000–159128, Jun. 13, 2000.

\* cited by examiner

*Primary Examiner*—William A Cuchlinski, Jr.
*Assistant Examiner*—Eric M Gibson
(74) *Attorney, Agent, or Firm*—Sughrue Mion, PLLC

(57) ABSTRACT

A control device which: controls a motor based upon a steering assist instruction value calculated in a steering assist command operating section based upon a steering torque generated in a steering shaft and a current control value calculated from a current value of the motor for applying a steering assist force to a steering mechanism; and at least partially possesses a gradient when a gain curve of characteristics of an entire control system having the steering assist command value as its input exceeds a predetermined value. The steering assist command value operating section is composed of an approximation functional expression in which a one-step derived function is continuous, and the steering assist command value is obtained by calculations based upon the approximation functional expression.

6 Claims, 22 Drawing Sheets

HPS

EPAS

FIG. 21

| VEHICLE SPEED (km/h) | GAIN | | HIGH/LOW THRESHOLD VALUE |
|---|---|---|---|
| | LOW STEERING TORQUE | HIGH STEERING TORQUE | |
| 0 ~ 2 | 48 | 48 | ABOUT 5.5Nm |
| 4 ~ 78 | 52 | 52 | ABOUT 4.1Nm |
| 80 ~ | 48 | 45 | ABOUT 2.5Nm |

Bode Diagrams

CONTROL DEVICE FOR ELECTRIC POWER STEERING APPARATUS

BACKGROUND OF THE INVENTION

1. Field of the Invention

The present invention relates to a control device for an electric power steering apparatus, and more particularly concerns such a control device for an electric power steering apparatus that achieves a superior steering performance by providing a smooth steering assist force.

2. Description of the Related Art

In an electric power steering apparatus for use in a vehicle, a steering torque and a vehicle speed generated by a steering shaft when a steering wheel is operated are detected, and based upon the detected signals, a steering assist instruction value is calculated so that, based upon the calculated steering assist instruction value, a motor is driven so as to assist the steering force of the steering wheel; thus, in order to calculate the steering assist instruction value and to control the motor based upon the steering assist instruction value, an electronic control circuit including a microcomputer is used.

Here, with respect to the steering torque, there are a component corresponding to a road-surface load generated in response to the operation of the steering wheel and a component corresponding to a frictional force exerted by a steering mechanism. For this reason, a system has been proposed, in which a control value corresponding to the road surface load determined based upon the detected steering torque and a control value corresponding to the frictional force of the steering mechanism are added so as to obtain the steering assist instruction value.

In the above control device, road-face load control values in association with steering torques and frictional force control values in association with the steering torques are preliminarily determined respectively, and stored in a memory; thus, in response to a detected steering torque, the corresponding data is read from the memory so that the steering assist instruction value is calculated (for example, Japanese Patent Publication No. 5-10271 B2).

In such a conventional control means for calculating the steering assist instruction value, the road-face load control value and the frictional force control value have been preliminarily determined in accordance with the steering torque; therefore, once the steering torque has been determined, the steering assist instruction value is allowed to vary only in response to the vehicle speed.

Therefore, the steering assist instruction values corresponding to the steering torques are preliminarily set with respect to a plurality of vehicle speeds so that, based upon a detected steering torque and vehicle speed, it is possible to directly obtain the steering assist value. By setting the steering assist instruction values corresponding to the vehicle speed and the steering torque in a step manner, it becomes possible to reduce the memory capacity; however, since the steering assist instruction value does not change continuously in response to changes in the vehicle speed and the steering torque, the steering assist force is not allowed to change smoothly, resulting in degradation in the sense of steering.

In order to solve the above problems, the steering assist instruction value can be set as finely as possible in accordance with the vehicle speed and the steering torque. However, this method causes a great increase in the required memory capacity, and the subsequent high costs.

In order to solve the above problems, a method has been proposed by the applicant of the present invention (Japanese Patent Application Laid-open No. 8-150954 A), in which: with respect to typical vehicle speeds, steering assist instruction values corresponding to steering torques are stored in a memory, and in the case when a determination is made in such a manner that the detected vehicle speed is located between the typical vehicle speeds stored in the memory, the steering assist instruction values corresponding to the steering torques with respect to the typical vehicle speeds before and after the detected vehicle speed are read from the storage means, and based upon the differences from the detected vehicle speed and vehicle speed correction coefficients, a steering assist instruction value corresponding to the detected vehicle speed and steering torque is calculated.

However, even in the above method in which, with respect to the typical vehicle speeds, the steering assist instruction values corresponding to the steering torques are stored in the memory, when the steering assist instruction values corresponding to the steering torques are set finely, there is still an increase in the required memory capacity and the resulting increase in costs. In addition, in the case when the steering assist instruction value is altered, another problem arises in that time consuming tasks are required since the stored data in the memory needs to be altered. Still another problem is that when the steering assist instruction value corresponding to the steering torque is calculated, that is, when, for example, the calculation is carried out using a finite word length of 8 bits, the lower digits (8 bits) of the results of calculation (having 16 bits) are rounded off, resulting in a quantization error due to digital operations. Such a quantization error causes the driver to have an undesired discontinuous sense of the steering when a gentle steering operation is carried out.

For this reason, another method has been proposed by the applicant of the present invention (Japanese Patent Application Laid-open No. 10-59203 A), in which: a steering assist instruction value operation means carries out operations based upon a plurality of approximation functional expressions so as to make an approximation to a high-order function expression that is coincident with at least three points in the steering assist instruction value corresponding to the steering torque.

However, in the above-mentioned operation method using a plurality of approximation functional expressions so as to make an approximation to a high-order function expression, the resulting function is formed by simply connecting a plurality of quadratic or more functions; therefore, although a smooth steering assist instruction value is obtained except for the connection sections of the functions, the rate of change in the function becomes discontinuous in the connection sections, resulting in degradation in the sense of steering. Moreover, in attempts to stabilize the mechanical system of the electric power steering apparatus, to stabilize vibration in the reduction gear section by using a rubber damper and to adjust the sense of steering, at a step after the steering assist instruction value operation unit of the control apparatus, a control system is used, in which a characteristic gain curve of the entire control system with the steering assist instruction value as an input at least partially has a gradient that exceeds a predetermined value (for example, 10 dB/dec). In this case, however, since the control system has a differential characteristic, and since one-step differentiation of the functions is discontinuous at the connecting sections of the functions of quadratic or more, the output of the control system becomes a discontinuous state or the like, resulting in further degradation in the sense of steering.

SUMMARY OF THE INVENTION

The present invention has been devised to solve the above-mentioned problems, and its object is to provide a control device for an electric power steering apparatus which achieves a continuous and pleasant sense of steering by supplying a continuous function as a steering assist instruction value of the electric power steering apparatus.

The present invention relates to a control device for an electric power steering apparatus, which controls a motor based upon a steering assist instruction value calculated in a steering assist instruction operation section based upon a steering torque generated in a steering shaft and a current control value calculated from a current value of the motor for applying a steering assist force to a steering mechanism, and has a gain curve of characteristics of the entire control system having the steering assist instruction value as its input, which at least partially possesses a gradient exceeding a predetermined value, and the object of the present invention is achieved by an arrangement in which: the steering assist instruction value operation unit is composed of an approximation functional expression in which at least one-step derived functions are continuous, and the steering assist instruction value is obtained through calculations based upon said approximation functional expression.

Moreover, the object of the present invention is achieved more effectively by providing the above-mentioned approximation functional expression as a spline function or a quadratic spline function.

BRIEF DESCRIPION OF THE DRAWINGS

In the accompanying drawings:

FIG. 21 is a drawing that shows a setting example of a gain given by a vehicle speed and a steering torque;

DETAILED DESCRIPTION OF THE PREFERRED EMBODIMENTS

The control device for an electric power steering apparatus of the present invention is provided with a steering torque detection means for detecting a steering torque that is generated from at least a steering shaft, a steering assist instruction value calculating means for calculating a steering assist instruction value based upon the detected steering torque, and a motor current control means for controlling a motor current based upon the steering assist instruction value that has been calculated; thus, the control device gives a steering assist force in accordance with the steering torque to the steering mechanism. In this arrangement, the steering assist instruction value calculating means is constituted by a calculating means which makes an approximation to a function in which at least one-step derived functions are continuous, and based upon the approximation functional expression, the calculating means calculates the steering assist instruction value corresponding to the detection value of the steering torque. Preferably, the approximation functional expression is provided as an n-order spline function, and more preferably, the approximation functional expression is provided as a quadratic spline function; thus, not only the steering assist instruction value corresponding to the detected value of the steering torque is continuous, but also at least the rate of change(one-step differentiation) is continuous.

Therefore, in comparison with a conventional method using a function in which a plurality of functions of quadratic or more are simply connected(see Japanese Patent Application Laid-open No. 10-59203 A), it becomes possible to achieve a control device of a steering apparatus that achieves a superior, smoother sense of steering.

Referring to figures, the following description will discuss embodiments of the present invention.

Figure 1:
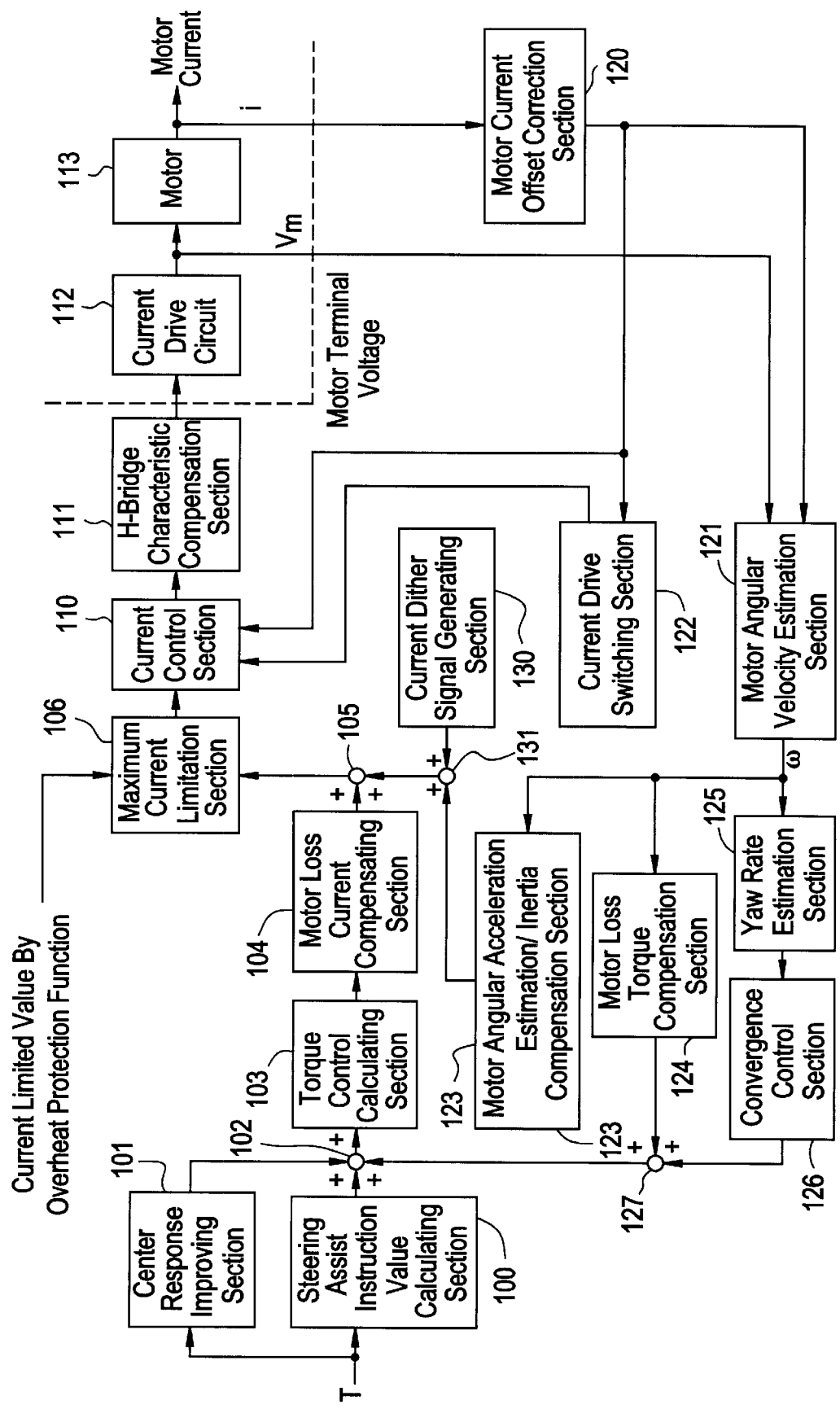
FIG. 1 is a block diagram that shows a construction of the present invention.

FIG. 1 is a block diagram that shows the entire structure of a control device in accordance with the present invention. Here, a steering torque T is inputted to a steering assist instruction value calculating section 100 and a center response improving section 101, and the respective outputs are inputted to an adder 102, and the result of addition is inputted to a torque control calculating section 103. The output signal of the torque control calculating section 103 is inputted to a motor loss current compensation section 104, and the output is inputted to a maximum current limitation section 106 through an adder 105 so that the maximum current value is limited and the resulting signal is inputted to the current control section 110. The output of the current control section 110 is inputted to a current drive circuit 112 through an H-bridge characteristic compensation section 111; thus, a motor 113 is driven.

A motor current i of the motor 113 is inputted to a motor angular velocity estimation section 121, a current drive switching section 122 and a current control section 110 through a motor current offset correction section 120, and a motor terminal voltage Vm is inputted to the motor angular velocity estimation section 121. An angular velocity ω estimated in the motor angular velocity estimation section 121 is inputted to a motor angular acceleration estimation/inertia compensation section 123, a motor loss torque compensation section 124 and a yaw rate estimation section 125, and the output of the yaw rate estimation section 125 is inputted to a convergence control section 126; then, the respective outputs of the convergence control section 126 and the motor loss torque compensation section 124 are calculated in an adder 127, and the result of addition is inputted to an adder 102. The motor loss torque compensation section 124 gives an assist corresponding to a torque loss to the direction in which the torque loss is generated in the motor 113, that is, the rotation direction of the motor 113, and the convergence control section 126 is allowed to brake the behavior of the wheel from rotating with deviations, in order to improve the converging property of the yaw of the vehicle.

Moreover, a current dither signal generating section 130 for generating a dither signal for finely vibrating the motor 113 to such an extent that the driver does not feel it, and the respective outputs of the current dither signal generation section 130 and the motor angular acceleration estimation/inertia compensation section 123 are added in an adder 131, and the result of addition is inputted to an adder 105. Then, the result of addition in the adder 105 is inputted to the maximum current limitation section 106.

Figure 2:
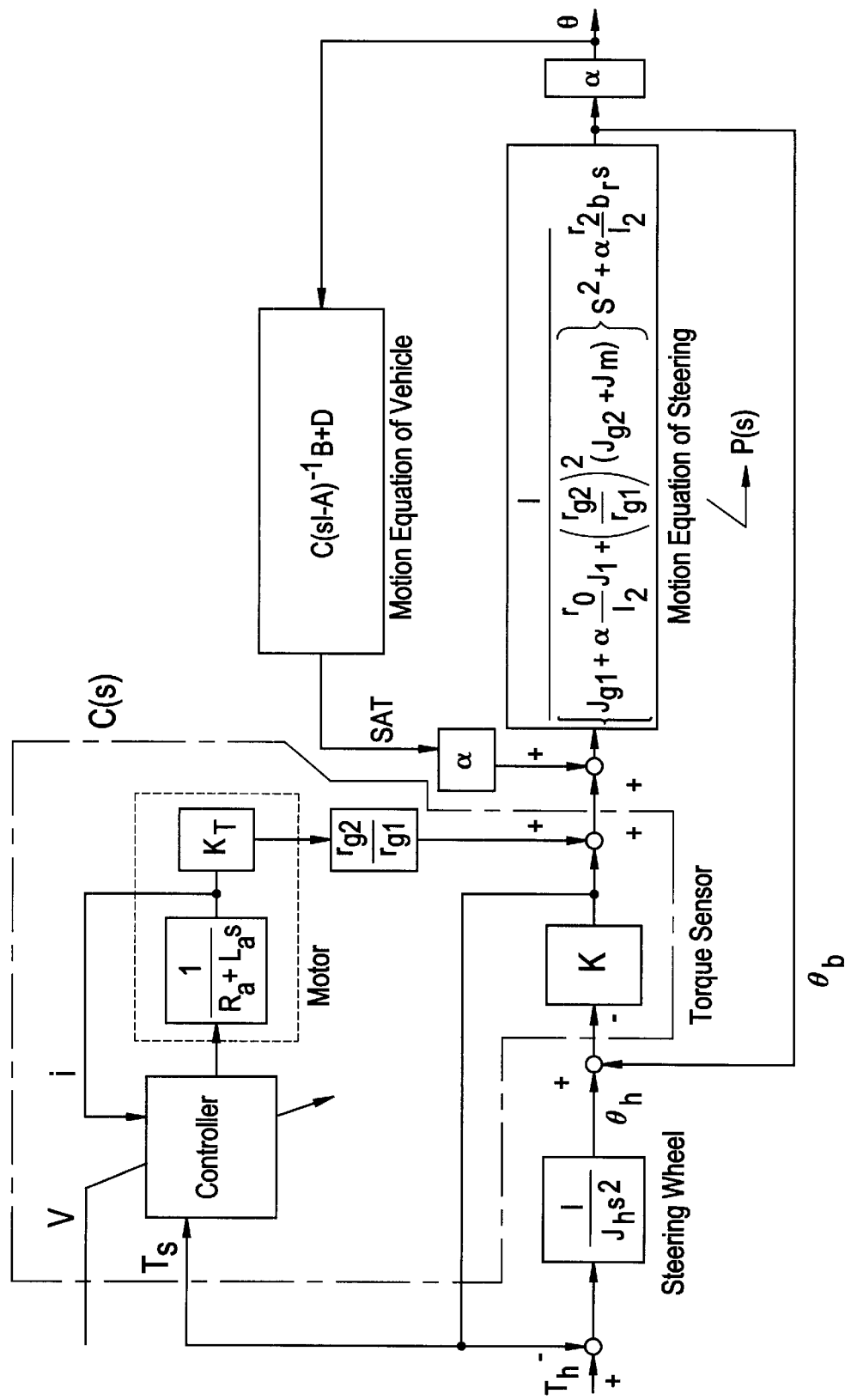
FIG. 2 is a block line diagram that shows a transmission function of a control unit.

Here, the electric power steering apparatus can be designed based upon the frequency area; therefore, the problem of trade off is solved by discriminating complementary sensitivity functions in FIG. 2 on the frequency area(for example, see Japanese Patent Application No. 2000-154284). In other words, in a superior steering apparatus, unnecessary disturbances are reduced, while necessary disturbances can be transmitted to the steering wheel. In FIG. 2, "Th" denotes steering torque, "V" vehicle speed, "θ" steering angle and "SAT" self-aligning torque.

For example, in a conventional hydraulic power steering apparatus, this problem is solved by adjusting the friction of the steering system; however, this fails to satisfy both of the above points simultaneously. In contrast, the present electric power steering system makes it possible to define the transmission characteristics from the road face to the steering wheel; therefore, it is possible to solve the problem of trade off based upon the frequency area. More specifically, with respect to the complementary sensitivity function of the control system, in a band in which disturbances to be suppressed are located, the complementary sensitivity function T(s) is set to be close to "1", while in a band in which disturbances to be transmitted are located, the complementary sensitivity function T(s) is set to be close to "0".

Figure 3:
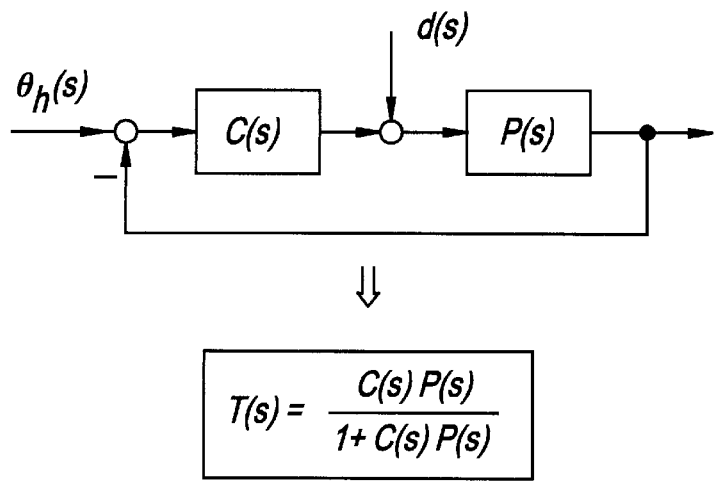
FIG. 3 is a simplified block diagram of FIG. 2.

In the complementary sensitivity function, until a vehicle has come to generate SAT(self-aligning torque), the transmission characteristic is calculated on the assumption that a simple spring(spring multiplier: Kv) is provided so that the constant gain is represented by "K/Kv/α$^2$". Moreover, in a band in which disturbances to be suppressed are located, the complementary sensitivity function is close to "1". Then, upon defining the complementary sensitivity function, FIG. 2 is interpreted as follows: FIG. 2 is considered as a control system for controlling the displacement of the torsion bar to reduce, and to reduce the displacement of the torsion bar is equivalent to reducing the steering torque as indicated by FIG. 2. Therefore, $θ_b$ is fed back toward $θ_h$ as a target so that it is regarded as a control system having a control gain K (rigidity of torsion bar) and a controller of an electric power steering. Here, the constant gain of the controller of the electric power steering is represented by the gradient of the assist characteristic so that the constant gain is zero within an area having a small torque. The rigidity of the torsion bar and the controller are joined together to form a new controller C(s), with the steering system being set to P(s), a simplified general control system as shown in FIG. 3 is provided. Here, the complementary sensitivity function T(s) is represented by an equation shown in FIG. 3, and d(s) represents disturbance given from tires of the vehicle, and this disturbance d(s) includes differences in dynamic characteristics between the unnecessary disturbance as well as the characteristics of the vehicle and the simple spring. Therefore, the object of the complementary sensitivity function T(s) is to transmit a difference between the simple spring and the actual dynamic characteristic by using an appropriate band, and also to suppress unnecessary disturbances.

Figure 4:
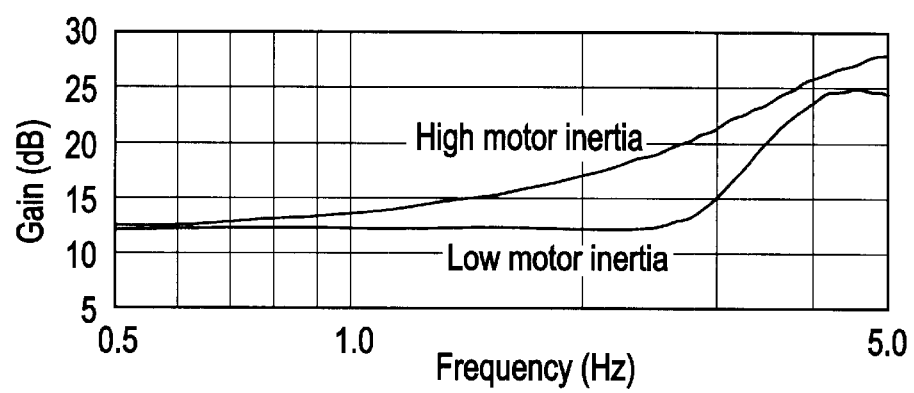
FIG. 4 is a frequency response diagram that shows a motor characteristic.
Figure 4:
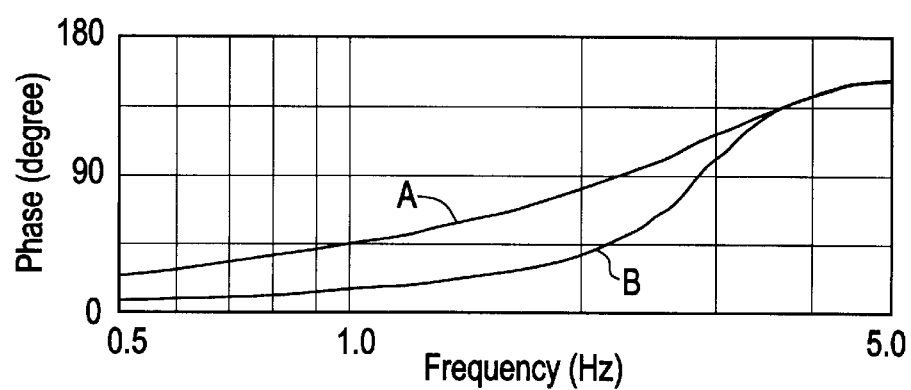

Here, taking into consideration the difference between the transmission characteristic from the road face information to the steering torque and the transmission characteristic from the steering angle to the steering torque, the inertia of the motor is positively utilized with respect to unnecessary disturbances, and the inertia of the motor felt when the vehicle is steered is compensated by the torque control system. The gain diagram in FIG. 4 shows comparisons of transmission characteristics from the steering angle to the steering torque derived from the motor inertias (high inertia, low inertia). The frequency response of the motor shown in FIG. 4 clearly shows that the influence of the motor inertia appears as a phase delay characteristic; therefore, the influence of the motor inertia can be compensated by a torque control system using a phase advance characteristic that is a characteristic reversed to the phase delay characteristic. A characteristic "A" in the phase diagram of FIG. 4 shows a case without any compensation, and a characteristic "B" shows a case with compensation.

In designing the road face sensitivity, first, the road face information needs to be detected by a torque sensor. In other words, an arrangement is made so as to prevent the motor from intervening with the road face information, and the complementary sensitivity function with respect to the frequency of the torque control system is then designed so as to approach "1" in the band in which disturbances to be suppressed are located, and also designed so as to approach "0" in the band in which disturbances to be transmitted are located. Since the road face information exerted by the tires are transmitted as an amount from which friction components of the respective factors have been subtracted, and since the motor inertia serves as a mechanical low-pass filer, the road information attenuates when the inertia is great. With respect to the design of the complementary sensitivity function, after the stability of the control system has been sufficiently ensured by adopting general control system designing methods, etc., a fine tuning operation is carried out in accordance with the vehicle in question.

In the present invention, in order to properly design the complementary sensitivity function, rolling-type rack and pinion, a rubber damper for a motor reduction mechanism, a non-contact torque sensor and a torque control system have been improved. The following description will discuss these methods in succession.

Figure 5:
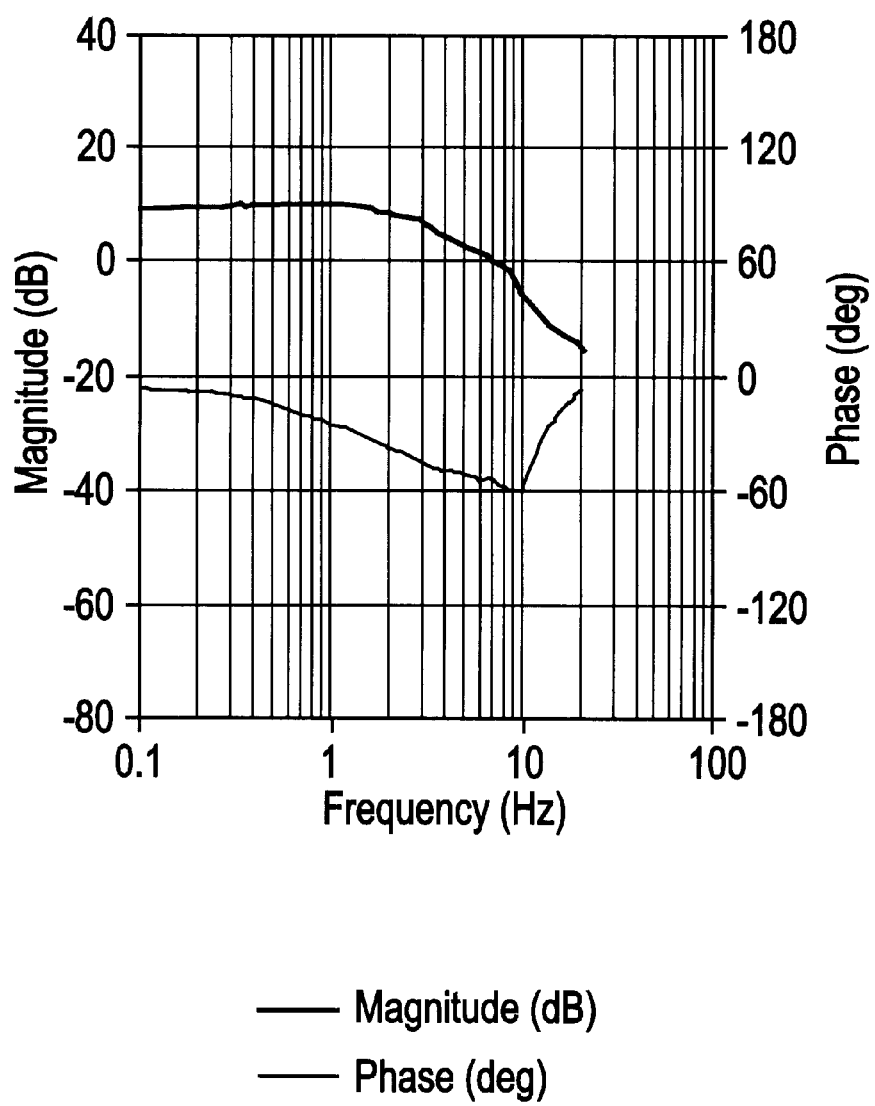
FIG. 5 is a drawing that shows a tuning example of a transmission characteristic from a road input to a steering torque.
Figure 6A:
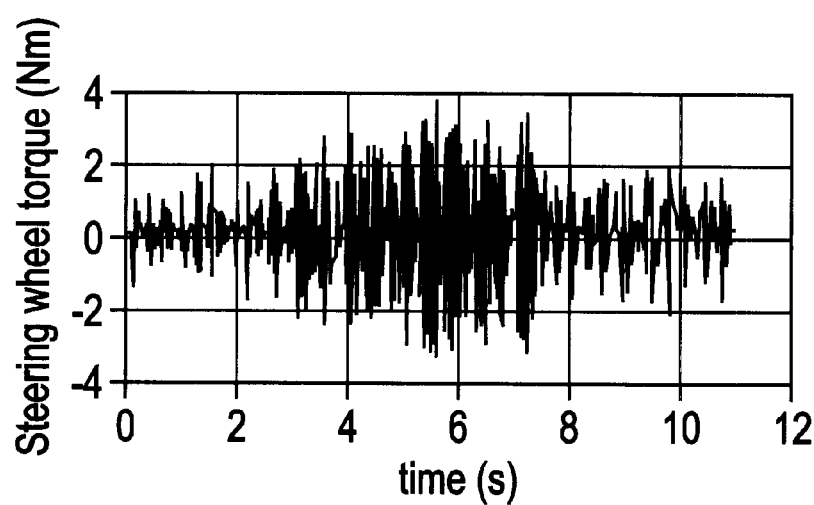
FIGS. 6A and 6B are drawings that show a measurement example(hydraulic type) of a steering torque that is obtained when traveling on a Belgian block road.
Figure 6B:
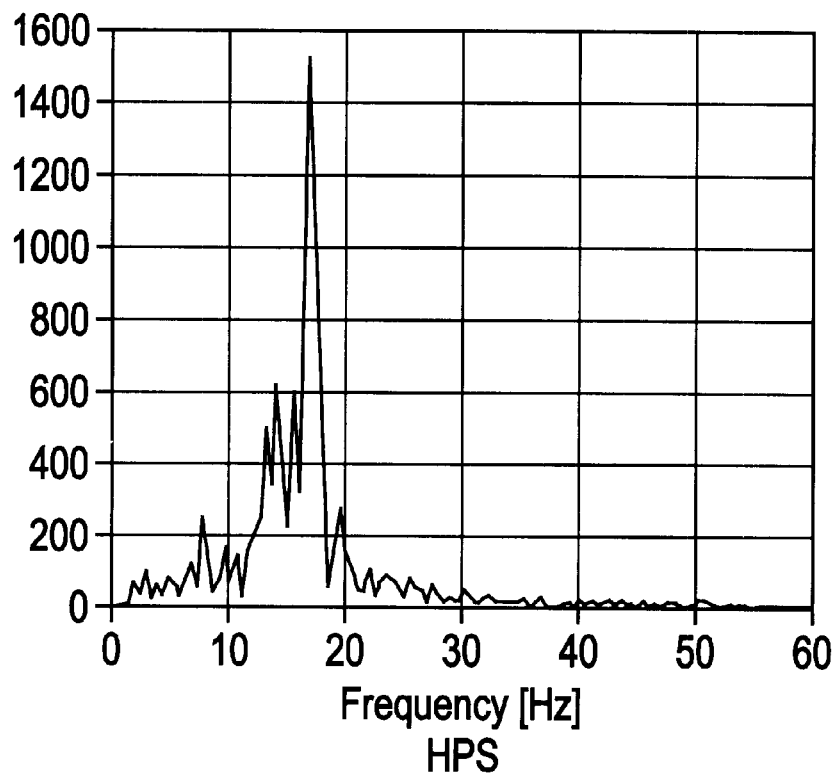
Figure 7A:
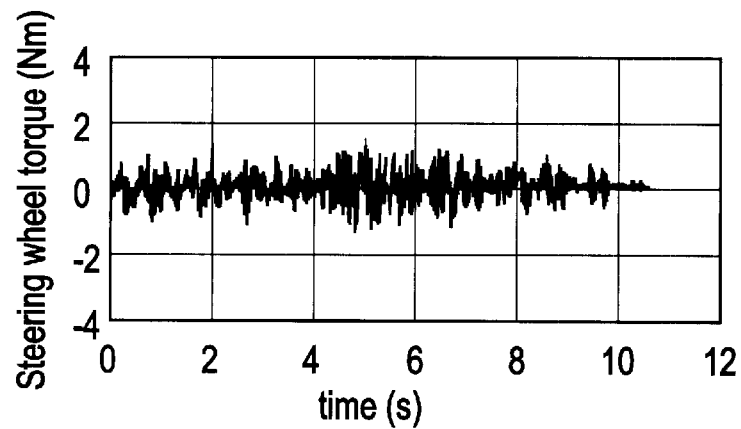
FIGS. 7A and 7B are drawings that show a measurement example(electric type) of a steering torque that is obtained when traveling on a Belgian block road.
Figure 7B:
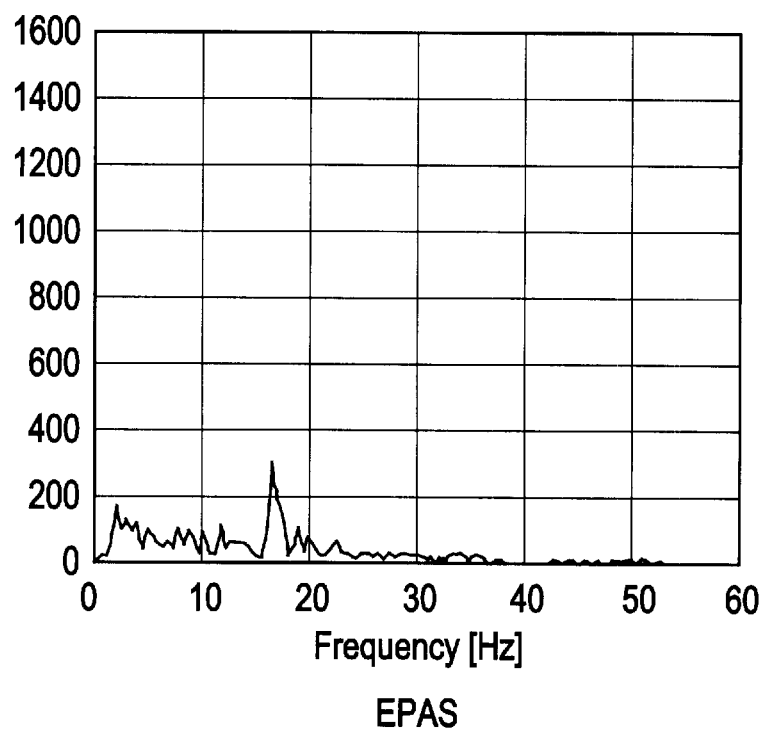
Figure 8A:
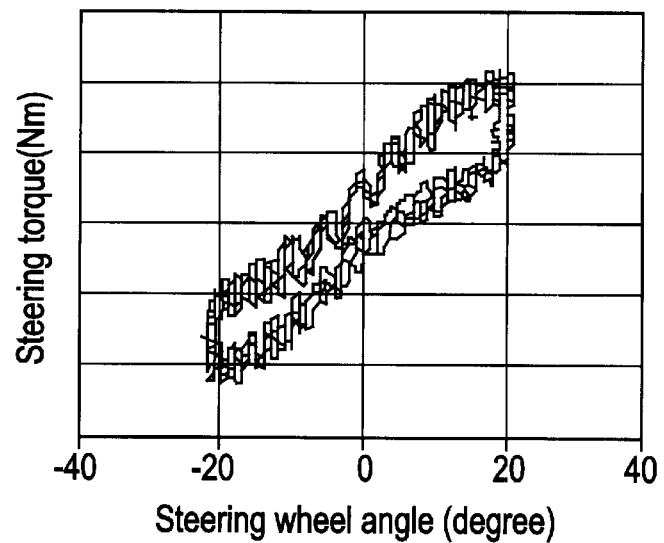
FIGS. 8A and 8B are drawings that show an example of a steering characteristic that is obtained when traveling at 100 Km/h.
Figure 8B:
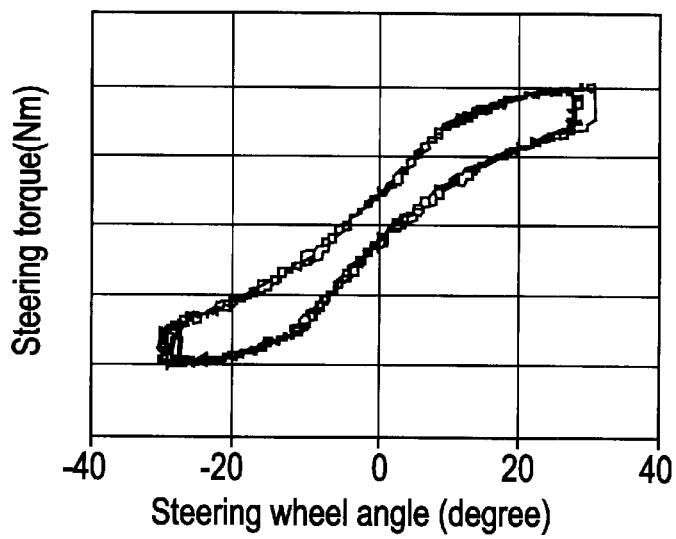

In order to prevent the motor from intervening with the road face information, the following factors (1) to (3) are effective: (1) to define a motor characteristic suitable for the road face information by a state feed-back process using an observer, (2) to adopt a mechanical clutch mechanism so as to provide a decoupling function between the motor and the column shaft, and (3) to adopt low friction elements. In comparison with the characteristic of a hydraulic system, FIGS. 5 to 8A, 8B show characteristic examples of an electric power steering apparatus designed as described above. FIG. 5 is an example of measurements of the road face sensitivity that has been tuned, in which a thick line represents the sensitivity(dB), and a thin line represents the phase(degree). Moreover, FIGS. 6A, 6B and 7A, 7B respectively show examples of measurements of the steering torque in the hydraulic type and the electric type, when traveling the Belgian block road, and the fluctuation in the steering torque of the hydraulic power steering apparatus is caused by the detected vibration of the suspension. FIG. 6A and FIG. 7A respectively show fluctuations in the steering torque with time, and FIG. 6B and FIG. 7B show frequency responses of 0 to 60 Hz. FIG. 8A shows examples of measurements of the steering characteristics(steering angle vs. steering torque) of the hydraulic power steering apparatus when traveling at 100 Km/h, and FIG. 8B shows examples of measurements of the steering characteristics (steering angle vs. steering torque) of the electric power steering apparatus device when traveling at 100 Km/h; and the fluctuation in the steering torque of the hydraulic power steering apparatus is caused by the detected vibration due to the flutter.

Figure 9:
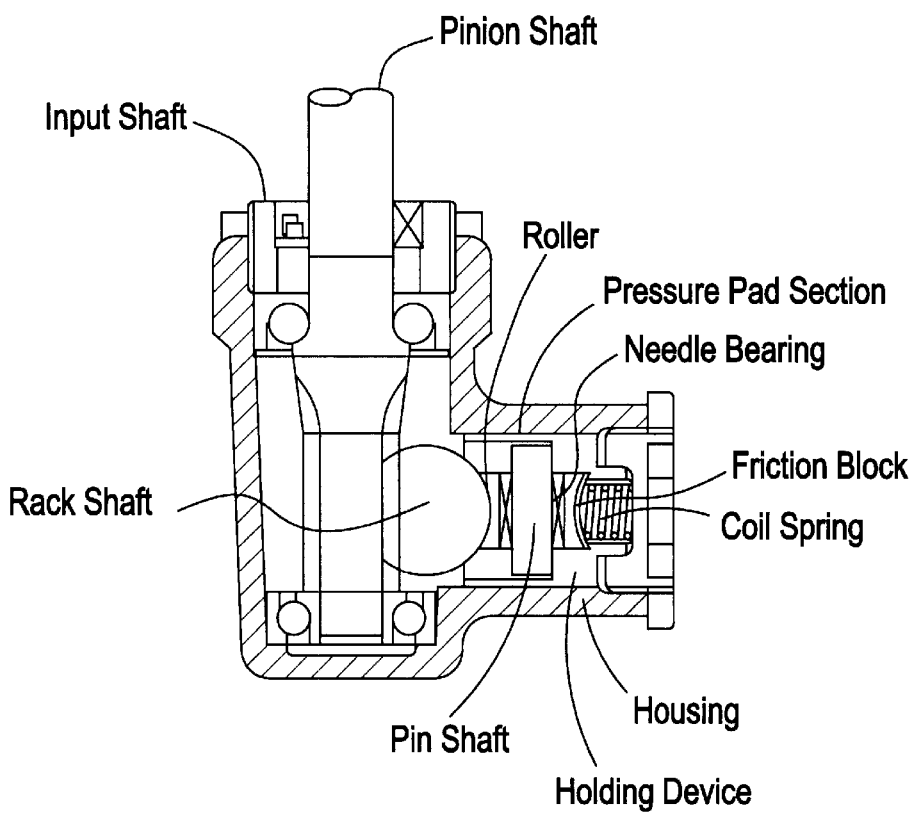
FIG. 9 is a structural drawing that shows a rack and pinion of rolling type used in the present invention.
Figure 10:
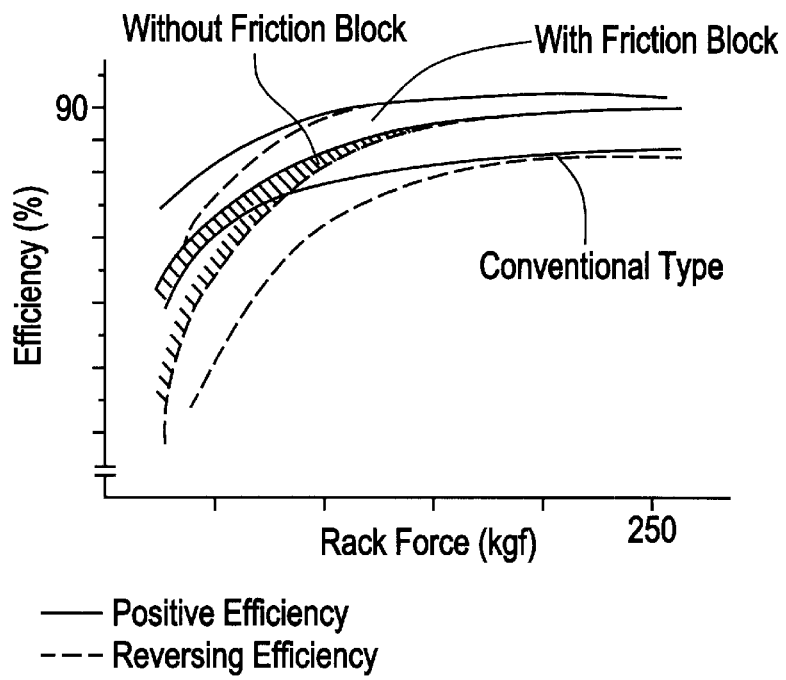
FIG. 10 is a drawing that shows a characteristic example of the mechanism of FIGS. 7A and 7B in comparison with a conventional device.

Next, FIG. 9 shows the mechanism of the rolling-type rack and pinion used in the present invention, and its characteristic is shown in FIG. 10; thus, an explanation will be given in comparison with a conventional mechanism. In other words, a pinion shaft is coaxially attached to an input shaft with the pinion shaft being engaged by a rack shaft so that the rack shaft is coupled to a pin shaft of a pressure pad section within a housing through a roller. The pin shaft is held by a needle bearing, and coupled to a coil spring through a friction block. The coil spring which is housed in a holding device is allowed to apply a pressing force to the pressure pad section, and the holding device is elastically held by a spring that is suspended in the gap to the inner wall of the housing. Additionally, such a rolling-type rack and pinion has been disclosed by the applicant of the present invention in Japanese Patent Application No. 10-335218 in detail.

Figure 11:
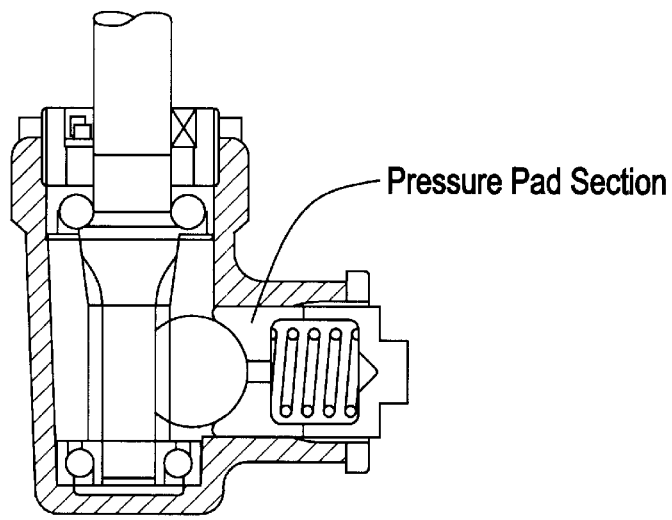
FIG. 11 is a structural drawing that shows a conventional rack and pinion of a rolling type.

In the rolling-type rack and pinion of the present invention, the pressure pad section supporting the pinion is constituted by the roller, the friction block, the needle gearing, the holding device, etc.; therefore, both of the high supporting rigidity and the low operational resistance can be achieved. In particular, in comparison with a conventional sliding-type rack and pinion mechanism shown in FIG. 11, as clearly shown by the characteristic diagram of FIG. 10, since the friction block is placed in the pressure pad section, a reverse input is low in an area in which the rack accelerating force is low so that the road face information is improved within a fine steering angle area, which is important at the time of high-speed traveling. In a conventional mechanism(without a friction block) shown in FIG. 11, since no friction block or the like is installed in the pressure pad section, the reverse input becomes high in the area in which the rack accelerating force is low.

The following description will discuss the rubber damper in the motor reduction gear section in accordance with the present invention.

Figure 12:
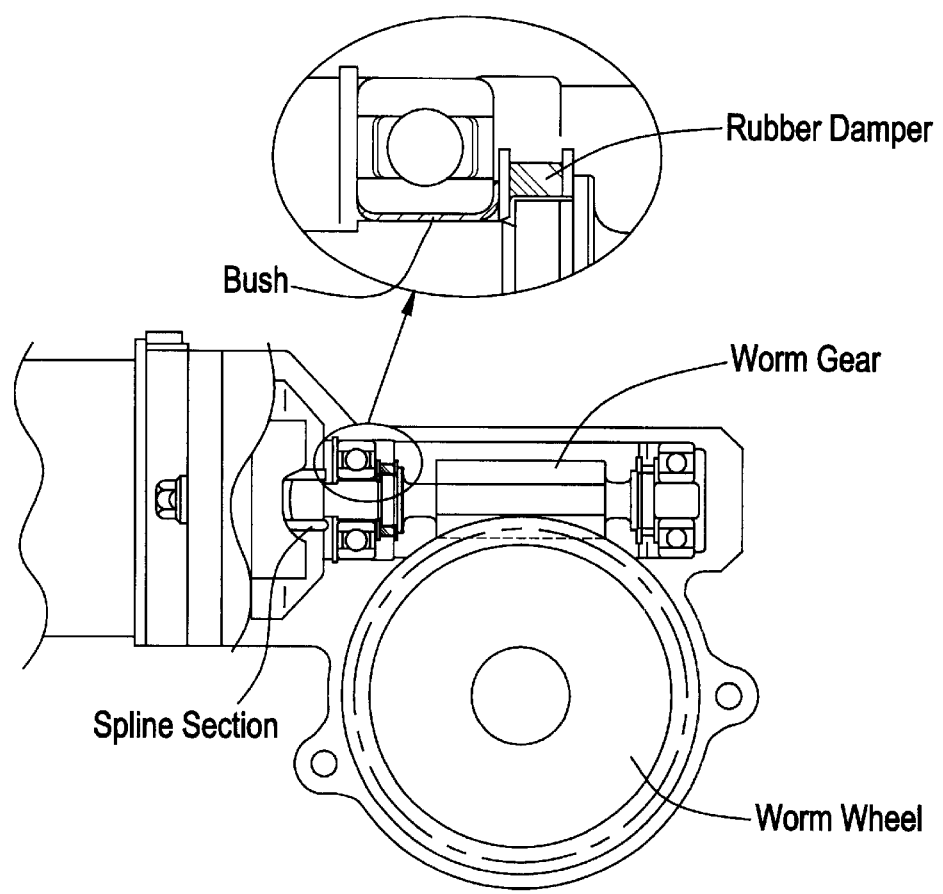
FIG. 12 is a structural drawing that shows a worm axis supporting section of a motor reduction gear.

As shown in FIG. 12, in the electric power steering apparatus, a rubber damper(rubber) is inserted to a spline section through a bush in a worm shaft supporting section of a motor reduction gear, in order to reduce rattling sound from the gear. Here, in the elastic area of the rubber, the displacement of the motor and the displacement of the column shaft are operated in an independent manner, with the result that the road face information is transmitted to the steering wheel shaft without being interrupted by the motor friction and inertia.

Figure 13:
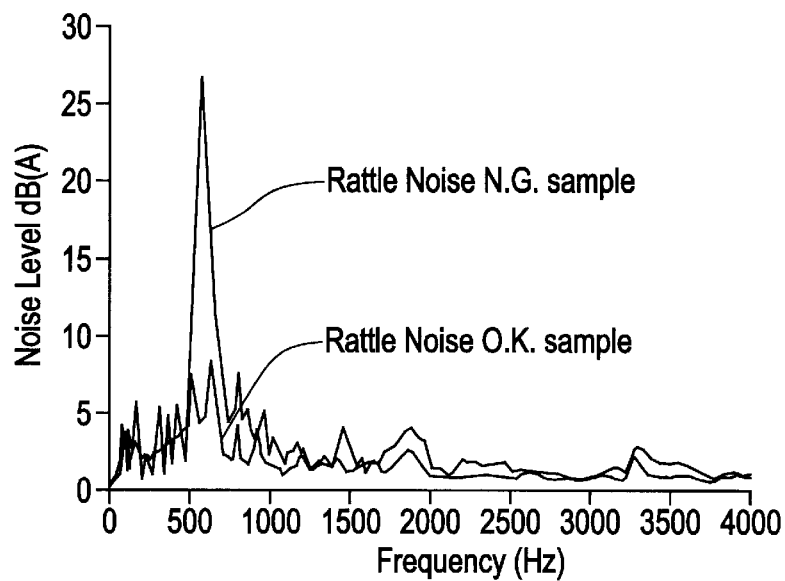
FIG. 13 is a drawing that shows a characteristic at the time when rubber is not attacked to the worm axis supporting section.
Figure 14:
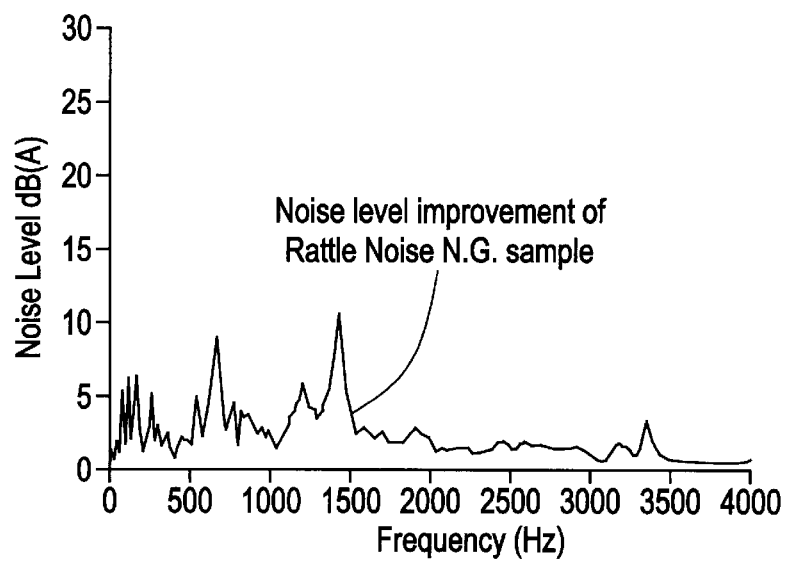
FIG. 14 is a drawing that shows a characteristic at the time when rubber is attached to the worm axis supporting section.

In the case when no rubber damper is attached, the resulting frequency characteristic is represented by FIG. 13, and in the case when the rubber damper is attached, the resulting frequency characteristic is represented by FIG. 14, which shows that the noise level is reduced.

Next, an explanation will be given of the improvement of a torque sensor used in the electric power steering.

Figure 15:
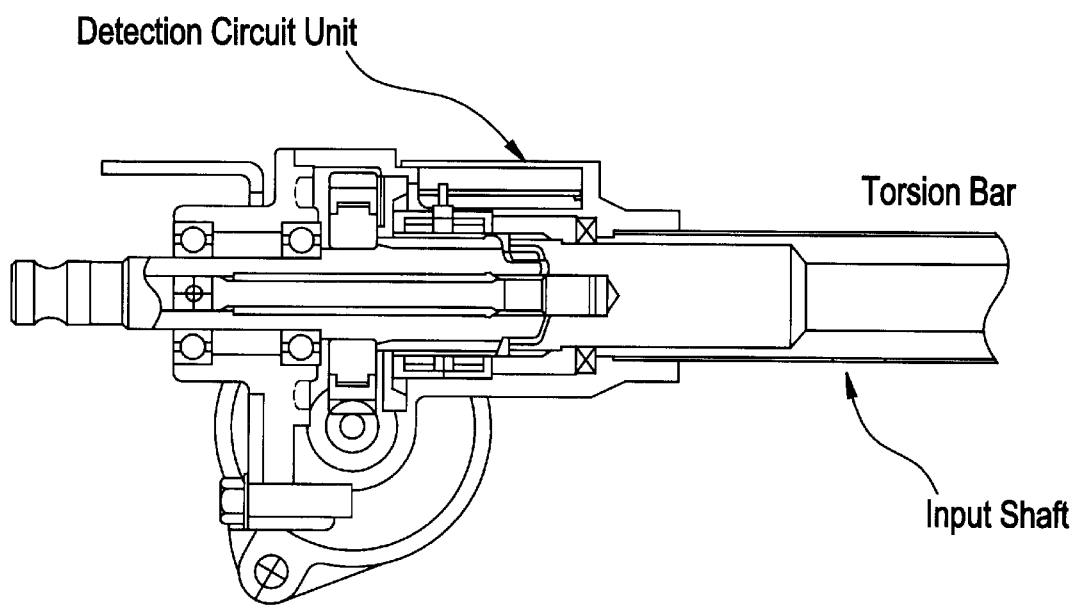
FIG. 15 is a cross-sectional mechanical drawing that shows a torque sensor used in the present invention.
Figure 16:
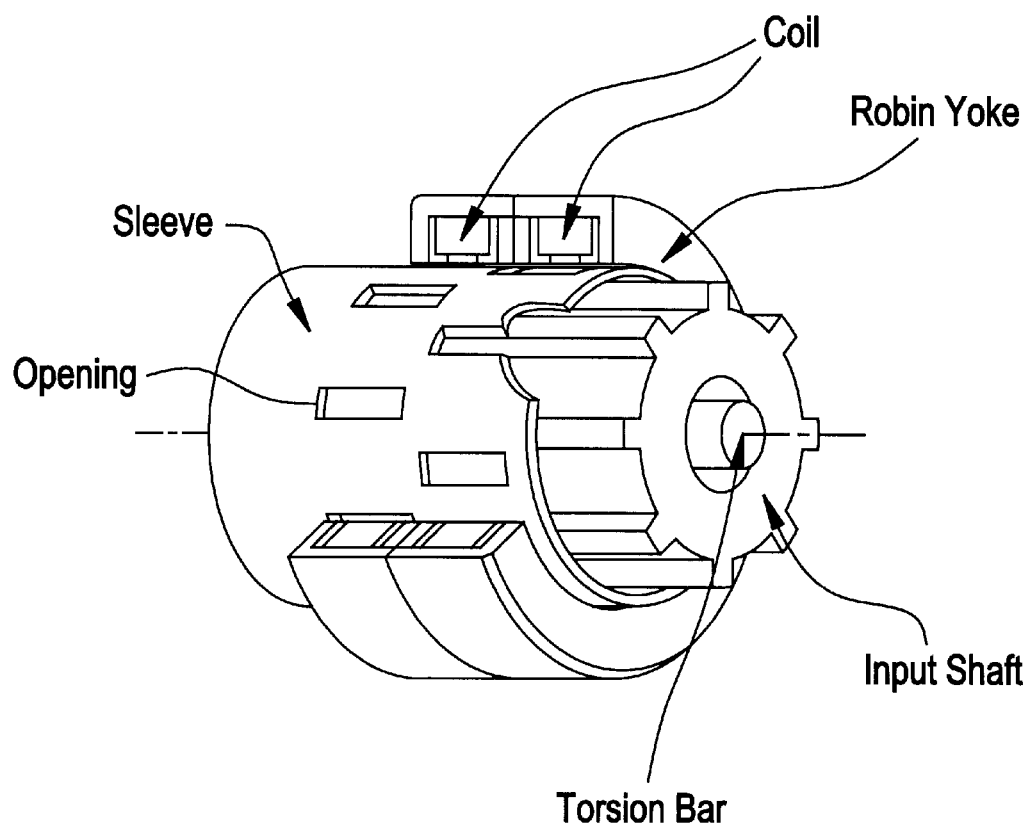
FIG. 16 is a perspective view of a torque sensor used in the present invention.

The hysteresis characteristic in the detection characteristic of the torque sensor appears as a delay characteristic upon receipt of a fine torque; therefore, this needs to be reduced to a minimum. For this purpose, the present invention uses a non-contact torque sensor having a small hysteresis width as shown in FIG. 15 and FIG. 16. In other words, FIG. 15 shows an installation structure of the non-contact torque sensor to a steering wheel shaft, and FIG. 16 is a perspective view that shows a partial cross-section of the structure of the sensor section. On the periphery of the input shaft(sensor shaft) made of a magnetic material such as SUS and Fe, a robin yoke forming a detection circuit unit is installed on the sleeve, and two pairs of coils are placed within the robin yoke. The sleeve is made of a conductive, non-magnetic material(for example, aluminum), and openings are formed along a coil row having an annular shape with a torsion bar being placed inside the input shaft.

In this arrangement, by utilizing the conductivity and non-magnetic property of the sleeve and the magnetic property of the input shaft, the torque with respect to the input shaft is detected in a non-contact state. In other words, a dense state of a periodical magnetic field is formed in the circumferential direction inside the sleeve by utilizing the surface effect, and the spontaneous magnetization of the input shaft is increased or decreased by the phase difference between the magnetic field and the spline of the input shaft so that the resulting change in impedance is detected as a voltage change at the coil end by a bridge circuit formed by a coil, etc.

Next, an explanation will be given of a design of an electric control system.

In order to achieve a proper sensitivity design of the road face information, the response in the current control forms one of the important factors. In particular, the response at the time when a current starts to flow is preferably made as linear as possible in order to improve the steering property in the vicinity of the neutral point. Upon linearization, instead of a conventional current control using a PI-controller as a base, a robust control using a norm model as a base is adopted so as to provide a linear current control.

Figure 17:
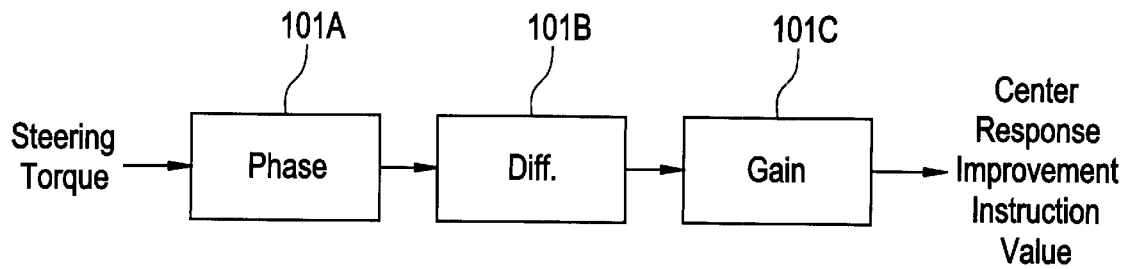
FIG. 17 is a block structural drawing that shows a center response improving section.
Figure 18:
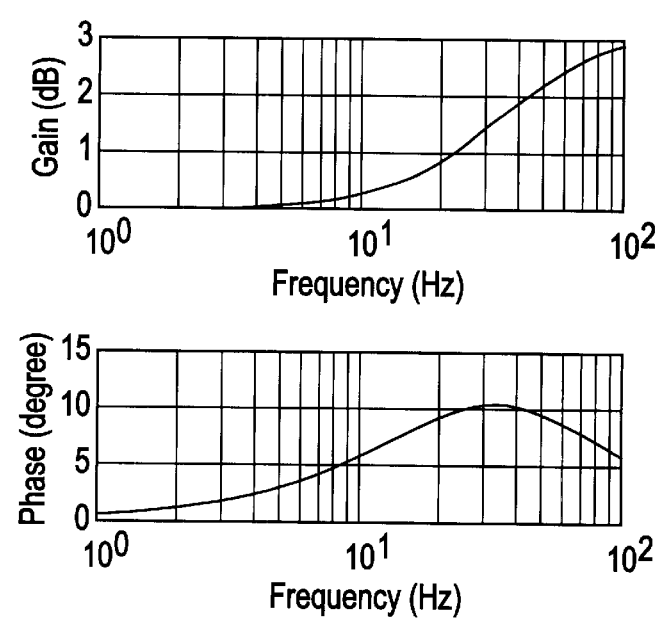
FIG. 18 is a drawing that shows a characteristic example of a phase compensation section.
Figure 19:
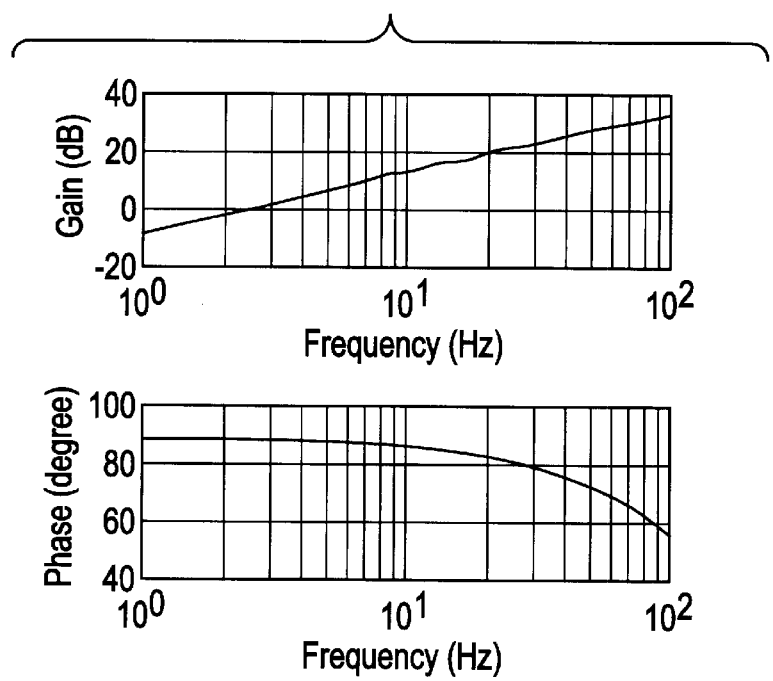
FIG. 19 is a drawing that shows a characteristic example of an approximation differential section.
Figure 20:
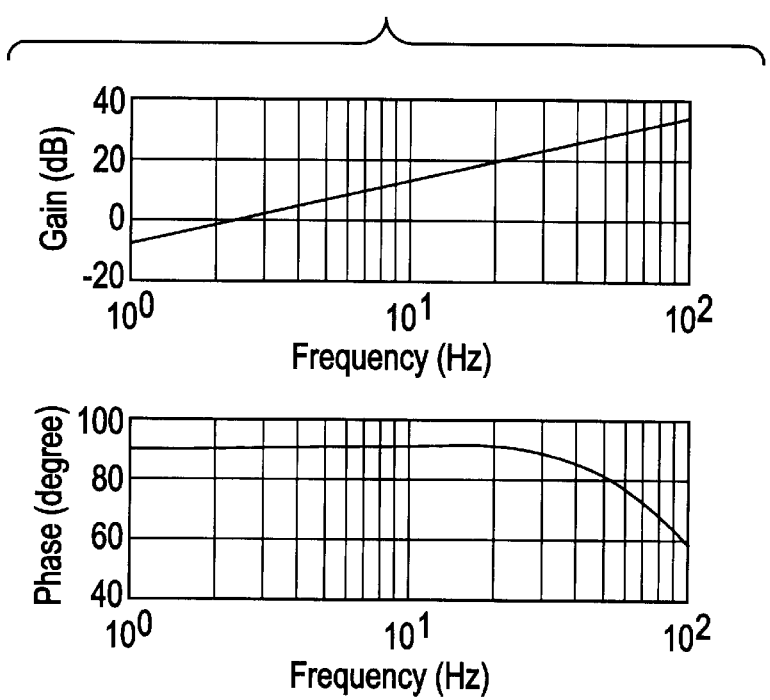
FIG. 20 is a drawing that shows a synthetic characteristic of the phase compensation section and the approximation differential section.

In the present invention, the control system shown in FIG. 1 is used, and first, a center response improving section 101 is constituted by a phase compensation section 101A, an approximation differential section 101B and a gain setting section 101C as shown in FIG. 17. Then, the phase compensation section 101A is allowed to have a frequency characteristic shown in FIG. 18, and the approximation differential section 101B is allowed to have a frequency characteristic shown in FIG. 19. Thus, a composite characteristic between the phase compensation and the approximate differentiation is represented by FIG. 20. Moreover, the gain setting section 101C switches a gain based upon the vehicle speed V and the steering torque T as shown in FIG. 21 so as to be set.

Furthermore, in order to reduce an unstable sense of steering in which the steering wheel is suddenly returned and to stabilize the steering, the steering torque is increased, the rate of change in the steering torque is increased, and the gain is reduced in the case when the steering torque is being reduced. In other words, the switching conditions are: |steering torque|(=A)>approximately 1.37 Nm, |and steering torque−steering torque(one sample before)|(=B) >approximately 0.137 Nm, and sign (A) < > sign (B). The gain after the switching is, for example, "46" at a vehicle speed of 0 to 2, "47" at a vehicle speed of 4 to 78 and "41" at a vehicle speed of not less than 80. Here, sign (A) < > sign (B) represents that signs are different between "A=steering torque" and "B=steering torque−steering torque(one sample before)".

Figure 22:
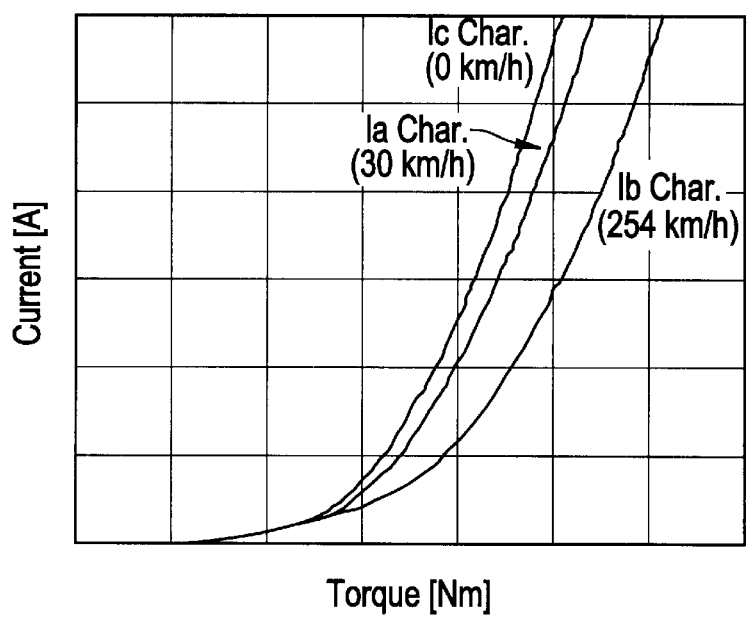
FIG. 22 is a drawing that shows a basic assist characteristic.
Figure 23:
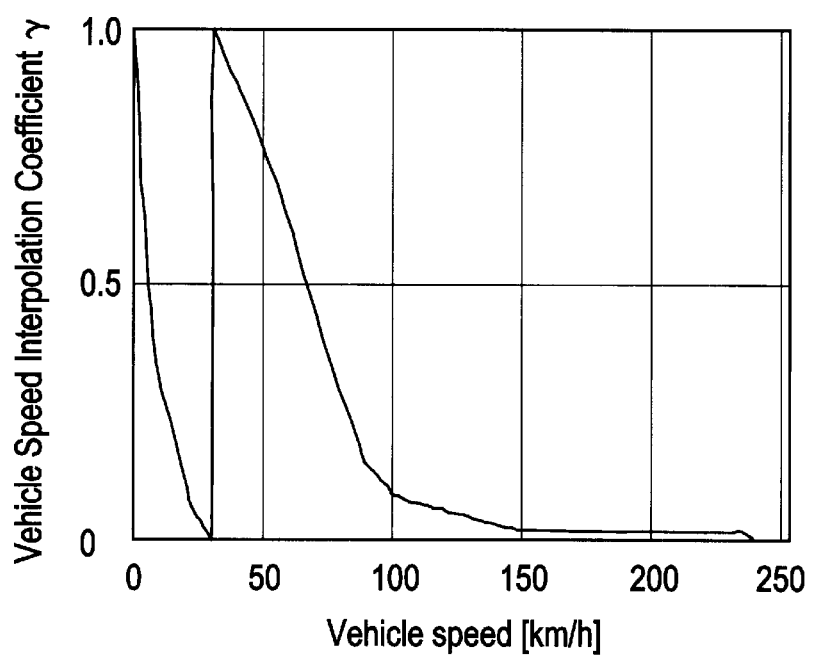
FIG. 23 is a drawing that shows one example of a vehicle speed interpolating operation.

Here, in the present invention, in the calculations of the amount of assist in the steering assist instruction value calculating section 100, the assist characteristics of the three typical vehicle speeds(0, 30, 254 Km/h) are set as basic characteristics, and in other vehicle speeds, interpolation is carried out between the basic characteristics every vehicle speed of 2 Km/h in accordance with the vehicle speed interpolation gain. Then, in the assist characteristic, the vehicle speed setting range is set to 0 to 254 Km/h, and the resolution is set to 2 Km/h. FIG. 22 shows the basic assist characteristic(torque vs. current) in which 0 Km/h=lo characteristic, 30 Km/h=la characteristic and 254 Km/h=lb characteristic are given. Then, with respect to vehicle speed interpolation calculations on other vehicle speeds, these calculations are carried out every 2 Km/h, by using an inter-vehicle speed(Km/h) interpolation coefficient γ as shown in FIG. 23. At the time when the vehicle speed is in a range of 0 to 30 Km/h, the assist current I is represented by: I=la (T)+γ (V) (lo(T)−la (T)), and at the time when the vehicle speed is in a range of 32 to 254 Km/h, the assist current I is represented by: I=lb (T)+γ(V)(la (T)−lb (T)).

Figure 24:
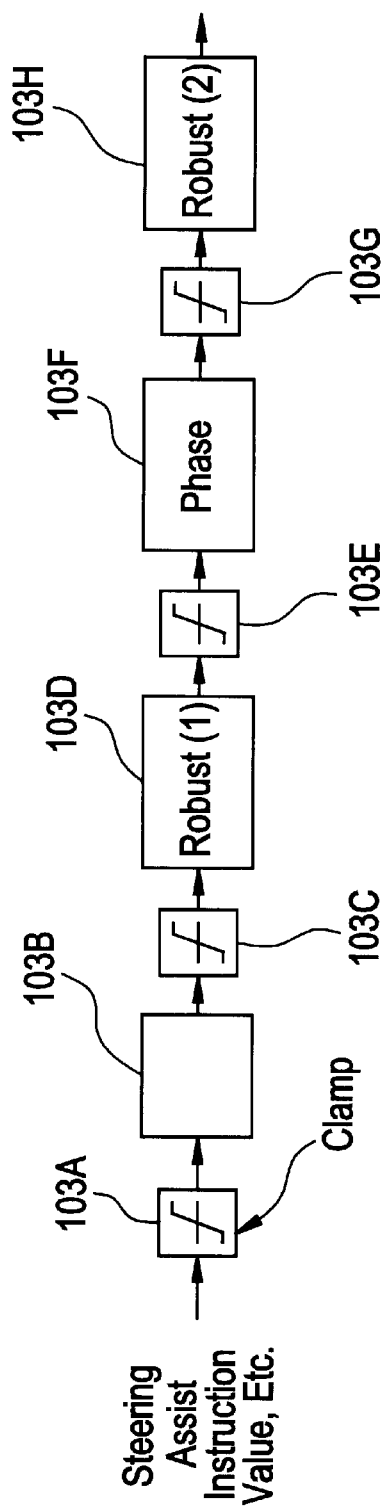
FIG. 24 is a block diagram that shows a structural example of a torque control operation.

Moreover, in the present invention, in attempts to stabilize the mechanical system of the electric power steering apparatus, to stabilize the vibration in the reduction gear section by using a rubber damper and to adjust the sense of steering, the torque control calculating section 103 is allowed to set the steering torque response. This arrangement is shown in FIG. 24, and a response defining section 103B is placed on the succeeding stage of the clamp circuit 103A, and on the succeeding stage, a robust stabilization compensation section 103D is placed through a clamp circuit 103C. Then, at the succeeding stage of the robust stabilization compensation section 103D, a phase compensation section 103F is placed through a clamp circuit 103E, and a robust stabilization compensation section 103H is further placed through a clamp circuit 103G.

Figure 25:
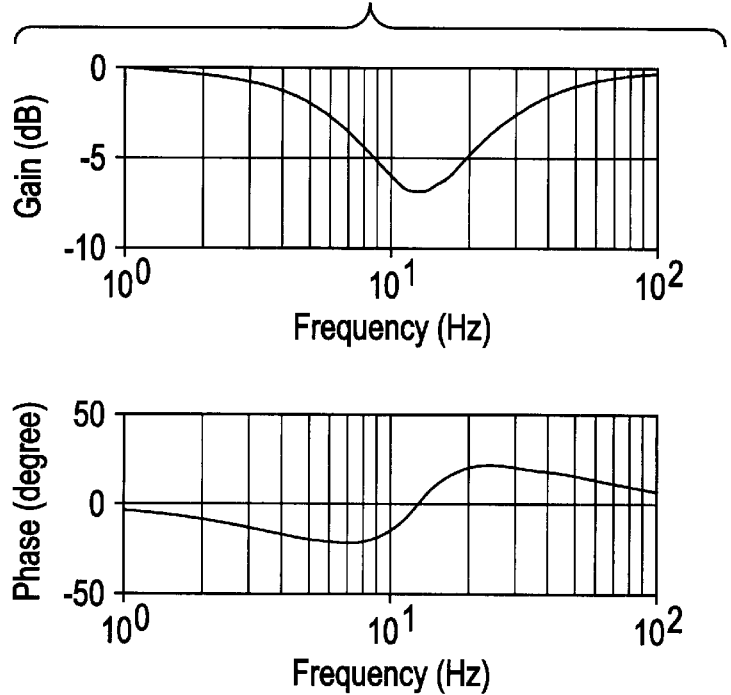
FIG. 25 is a drawing that shows a robust stabilizing compensation.
Figure 26:
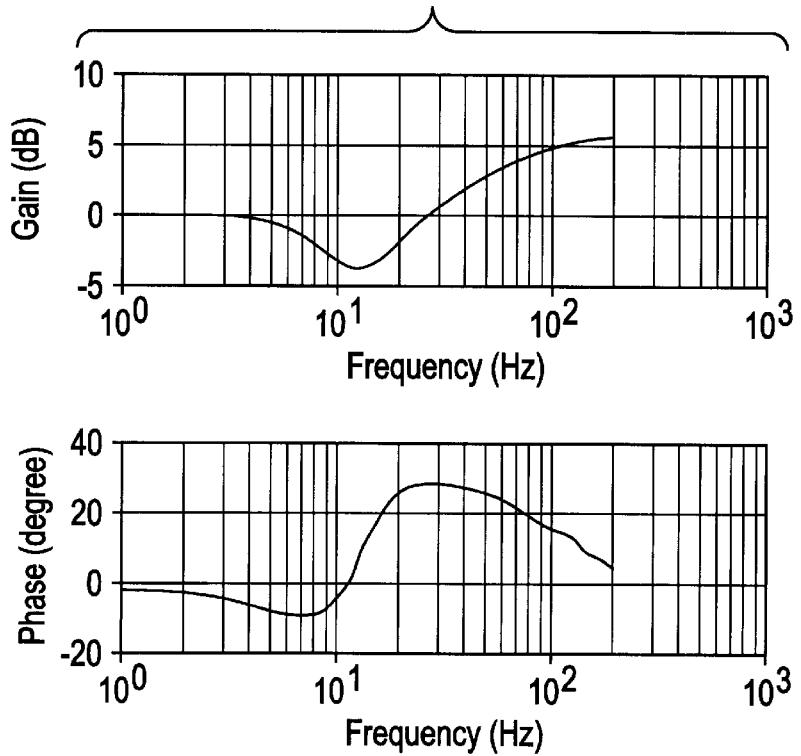
FIG. 26 is a drawing that shows a characteristic example of a control system.
Figure 27:
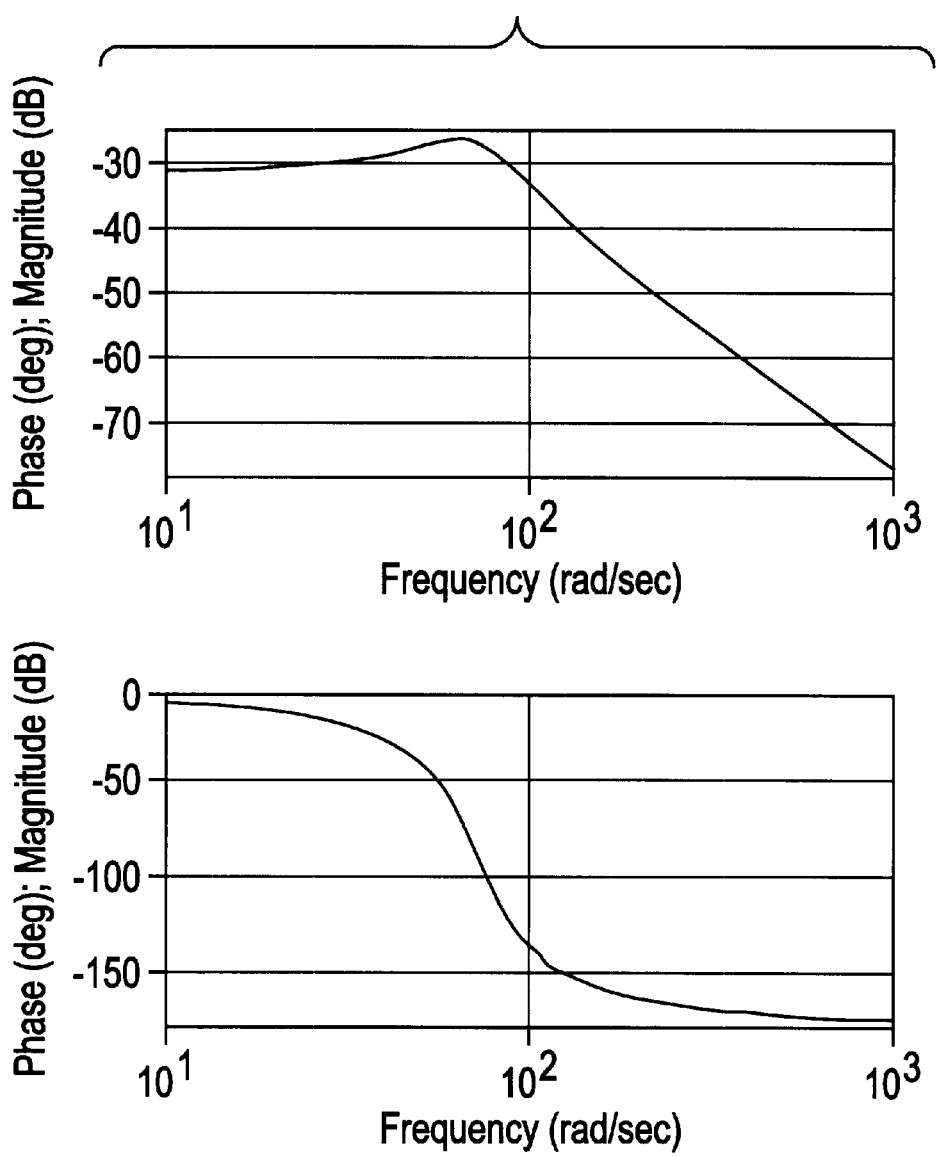
FIG. 27 is a drawing that shows a characteristic example of a mechanical system.

The characteristic of the robust stabilization compensation section 103H is shown in FIG. 25, and the characteristic of the entire control system is set in a manner as shown in FIG. 26. As clearly shown in FIG. 26, the gain curve of the characteristic of the entire control system at least partially has a gradient exceeding 10 dB/dec. Since the characteristic of the mechanical system is set in a manner as shown in FIG. 27, peak portions and bottom portions are cancelled as a whole to provide a virtually flat characteristic.

1. FIRST EXAMPLE

Figure 28:
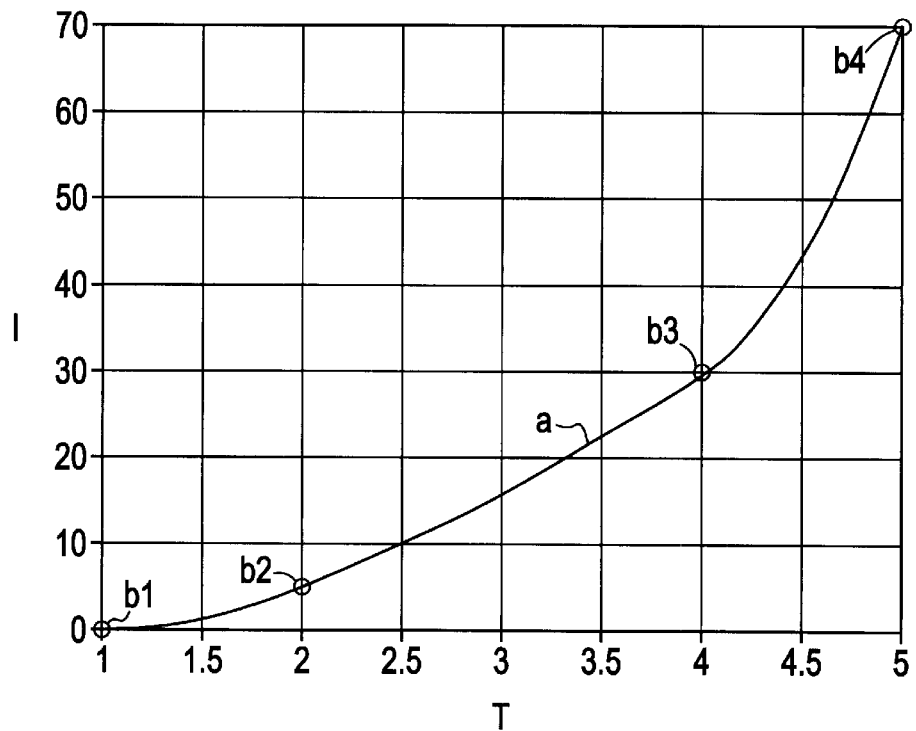
FIG. 28 is a characteristic drawing that explains the present invention.

Line "a" of FIG. 28, which shows a characteristic of the steering assist instruction value calculating unit 100, is a characteristic curve that indicates the relationship between a steering torque T and the corresponding desired assistant instruction value I. Several points(for example, four points (b1, b2, b3, b4)) are extracted from a desired characteristic curve "a", and a numerical operation is carried out by interpolating the gaps of the four points b1, b2, b3, b4 with a function in which at least one step of derived functions are continuous(for example, a spline function and a 2-nd order spline function) so that the desired assistant instruction value I corresponding to the steering torque T is obtained. Here, the spline function is a function in which multiple item curves respectively defined in respective small sections are connected to each other as smoothly as possible, and in this case, it is not necessary to satisfy the condition that a single polynomial equation is provided in all the sections. A m-order spline function is a function in which a differentiation on its m-step forms a step function and differentiations on not more than (m-1) steps are continuous.

Based upon the data points (b1, b2, b3, b4) =(x1, y1) (x2, y2) (x3, y3) (x4, y4) extracted from the characteristic curve "a" of FIG. 28, for example, the relationship between the steering torque T that has been interpolated by, for example, the 2nd-order spline function (the one-step differentiation is set to "0" at the left end point) and the steering assist instruction value I is represented as the following equations (1) as three quadratic equations (11, 12, 13) that interpolate the gaps between the data points.

$$\begin{aligned} I1 &= y1 + a1 \times (x - x1) + b1 \times (x - x1)^2 \\ I2 &= y2 + a2 \times (x - x2) + b2 \times (x - x2)^2 \\ I3 &= y3 + a3 \times (x - x3) + b3 \times (x - x3)^2 \end{aligned} \quad (1)$$

Here, the coefficients a1, a2, a3, b1, b2, b3 of the equations (1) are represented by the following equations (2).

$$a1 = 0 \quad (2)$$

-continued $$\left.\begin{array}{l}b1 = (y2 - y1 - a1 \times (x2 - x1))/(x2 - x1)^2 \\ a2 = a1 + 2 \times b1 \times (x2 - x1) \\ b2 = (y3 - y2 - a2 \times (x3 - x2))/(x3 - x2)^2 \\ a3 = a2 + 2 \times b2 \times (x3 - x2) \\ b3 = (y4 - y3 - a3 \times (x4 - x3))/(x4 - x3)^2\end{array}\right\}$$

In accordance with the detected steering torque T, the approximate equation corresponding to the section is selected, and based upon the selected approximate equation, the steering assist instruction value I corresponding to the detected steering torque T is calculated so that the calculation of the steering assist instruction value I is carried out at high speeds.

Here, the one-step differentiations of the quadratic curves 11, 12, 13 shown in the above equations (1) are respectively indicated by the following equations (3).

$$\left.\begin{array}{l}I1' = a1 + 2 \times b1 \times (x - x1) \\ I2' = a2 + 2 \times b2 \times (x - x2) \\ I3' = a3 + 2 \times b3 \times (x - x3)\end{array}\right\} \quad (3)$$

In this case, the one-step differentiations are continuous also at the connecting point (b2, b3)=(x2, y2) (x3, y3).

$$\left.\begin{array}{l}\text{At } (x2, y2), \text{ the following equation hold:} \\ I1' = a1 + 2 \times b1 \times (x2 - x1), I2 = a2, \\ \text{At } (x3, y3), \text{ the following equation holds:} \\ I2' = a2 + 2 \times b2 \times (x3 - x2), I3 = a3.\end{array}\right\} \quad (4)$$

In other words, not only the steering assist instruction value I corresponding to the detection value of the steering torque T is continuous, but also at least the rate of change (one-step differentiation) is continuous; therefore, in comparison with a conventional method in which a plurality of quadratic or more functions are simply connected, it is possible to achieve a control device of a steering apparatus which can provide a far more desirable, smoother sense of steering.

In the present embodiment, for example, a quadratic spline function is used as a function for interpolating points extracted from desired characteristic curve; however, the same effects are obtained as long as at least one-step derived functions are continuous, and for example, a tertiary spline function and a polynomial in accordance with Lagrange's formula may be used. However, in the case when Lagrange's formula is used, n-number of data points result in a (n−1)-order polynomial; this causes problems such as an increase in operation costs and an increase in quantization errors in the case when a fixed decimal point calculating means is used. For this reason, it is preferable to use a spline function which can provide smooth, superior approximation, although it uses comparative low-order polynomials. Moreover, in order to shorten the operation time and to save the memory, it is preferable to use the quadratic spline function.

2. SECOND EXAMPLE

An explanation will be given of a case in which, data points(b1, b2, b3, b4) =(x1, y1)(x2, y2)(x3, y3)(x4, y4) extracted from a characteristic curve "a" indicating a desired assistant instruction value I corresponding to the steering torque T of FIG. 28, are represented by the following equations (5).

$$\left.\begin{array}{l}b1 = (x1, y1) = (1, 0) \\ b2 = (x2, y2) = (2, 5) \\ b3 = (x3, y3) = (4, 30) \\ b4 = (x4, y4) = (5, 70)\end{array}\right\} \quad (5)$$

In the conventional system(Japanese Patent Application Laid-open No. 10-59203 A), the steering assist instruction value calculating means is constituted by an operation means which carries out operations based upon a plurality of approximation function expressions that make approximations on high-order function expressions that are coincident with at least three points on the steering assist instruction values corresponding to steering torques that are defined by high-order functional expressions. For example, supposing that a quadratic function expression passing through, for example points b1, b2 and b3, is c1, and that a quadratic function expression passing through, for example points b2, b3 and b4, is c2, the quadratic functions c1 and c2 are represented by the following equations (6).

$$\left.\begin{array}{l}c1 = 2.5 \times x^2 - 2.5 \times x \\ c2 = 9.1667 \times x^2 - 42.5 \times x + 53.33\end{array}\right\} \quad (6)$$

Figure 29:
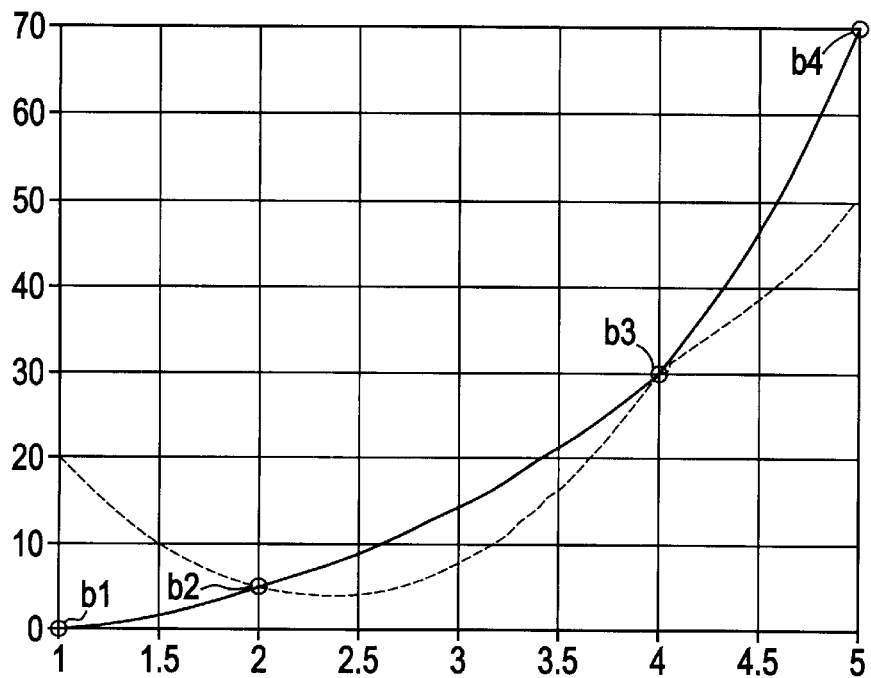
FIG. 29 is a characteristic drawing that explains the present invention.

Here, the quadratic functions c1 and c2 are represented by characteristic curves shown in FIG. 29. In the case when, for example, a curve c1 is adopted from the point b1 to the point b3 via the point b2, and when a curve c2 is adopted from the point b3 to the point b4, the relationship between the steering torque T and the steering assist instruction value I is represented by a solid line.

In this case, the one-step differentiations c1' and c2' of the respective quadratic functions c1 and c2 are represented by the following equations (7) based upon the above equations (6).

$$\left.\begin{array}{l}c1' = 5 \times x - 2.5 \\ c2' = 18.333 \times x - 42.5\end{array}\right\} \quad (7)$$

Figure 30:
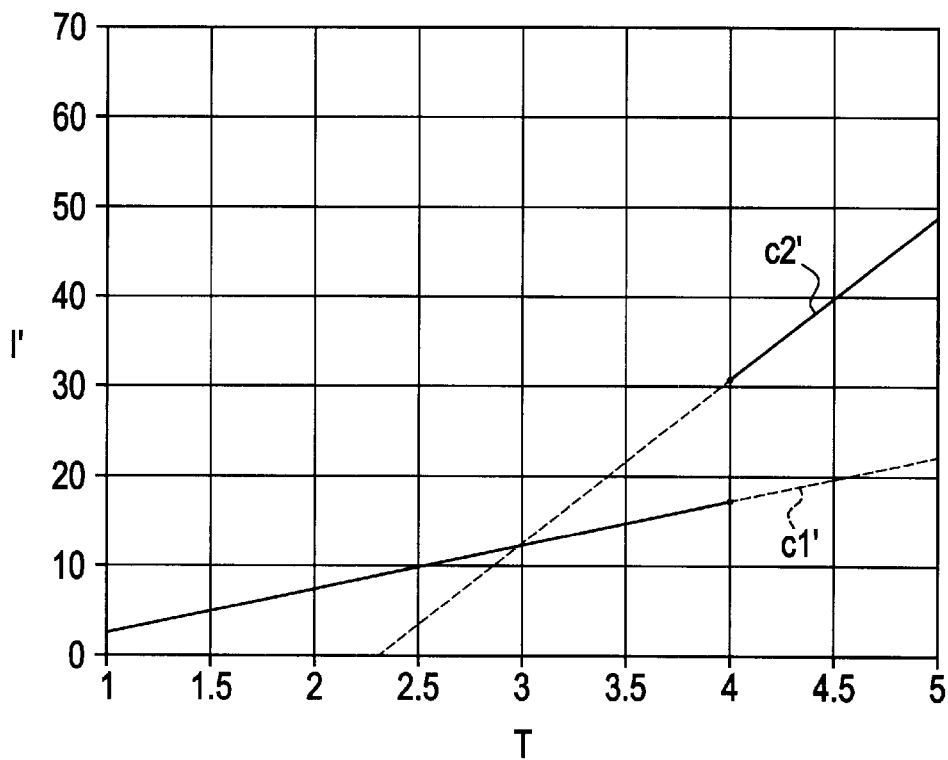
FIG. 30 is a characteristic drawing that explains the present invention.

Here, the characteristic curves of the one-step differentiations c1' and c2' are indicated in FIG. 30. Further, the curve c1 is adopted from the point b1 to the point b3, and the curve c2 is adopted from the point b3 to the point b4; therefore, with respect to the differentiation values, they are of course represented by a curve c1' from the point b1 to the point b3 and a curve c2' from the point b3 to the point b4.

As clearly indicated by the characteristic curve of FIG. 30, the one-step differentiation values corresponding to the steering torque T of the steering assist instruction value I, are discontinuous at the point b3. This discontinuity gives adverse effects on the sense of steering. Moreover, in attempts to stabilize the mechanical system of the electric power steering apparatus, to stabilize the vibration in the reduction gear section by using a rubber damper and to adjust the sense of steering, at a step after the steering assist instruction value calculating unit of the control device, a control system is used, in which a characteristic gain curve of the entire control system with the steering assist instruction value as an input, at least partially has a gradient that exceeds a predetermined value(for example, 10 dB/dec). In this case, however, since the control system has a differential characteristic, and since the one-step differentiations of the functions are discontinuous at the connecting sections of the functions of quadratic or more, the output of the control system becomes a discontinuous state or the like, resulting in further degradation in the sense of steering.

In the present invention, for example, in accordance with the first embodiment, three quadratic curves d1, d2, d3 for interpolating the gaps of data points (b1, b2, b3, b4), extracted from a characteristic curve "a" indicating a desired assistant instruction value I corresponding to the steering torque T of FIG. 28, are indicated by the following equations (8).

$$d1 = 5 \times (x-1)^2$$
$$d2 = 5 + 10 \times (x-2) + 1.25 \times (x-2)^2 \quad (8)$$
$$d3 = 30 + 15 \times (x-4) + 25 \times (x-4)^2$$

Figure 31:
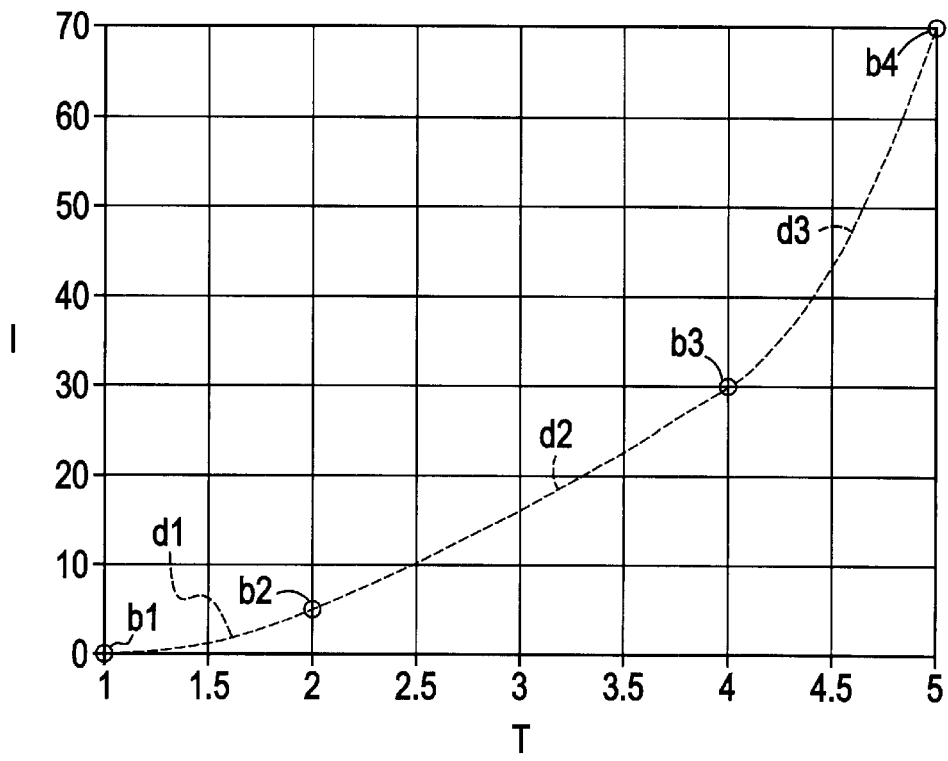
FIG. 31 is a characteristic drawing that explains the present invention.

Here, the quadratic functions d1, d2, d3 are shown in FIG. 31. In response to the detected steering torque T, an approximation equation for the corresponding section is selected, and based upon the selected approximation equation, a steering assist instruction value corresponding to the detected steering torque is calculated based upon the selected approximation equation, it is possible to easily carry out the operations at high speeds.

In this case, the one-step differentiations d1', d2', d3' of the respective quadratic functions d1, d2, d3 are represented by the following equations (9) based upon the above equation (8).

$$d1' = 10 \times (x-1)$$
$$d2' = 10 + 2.5 \times (x-2) \quad (9)$$
$$d3' = 15 + 50 \times (x-4)$$

Figure 32:
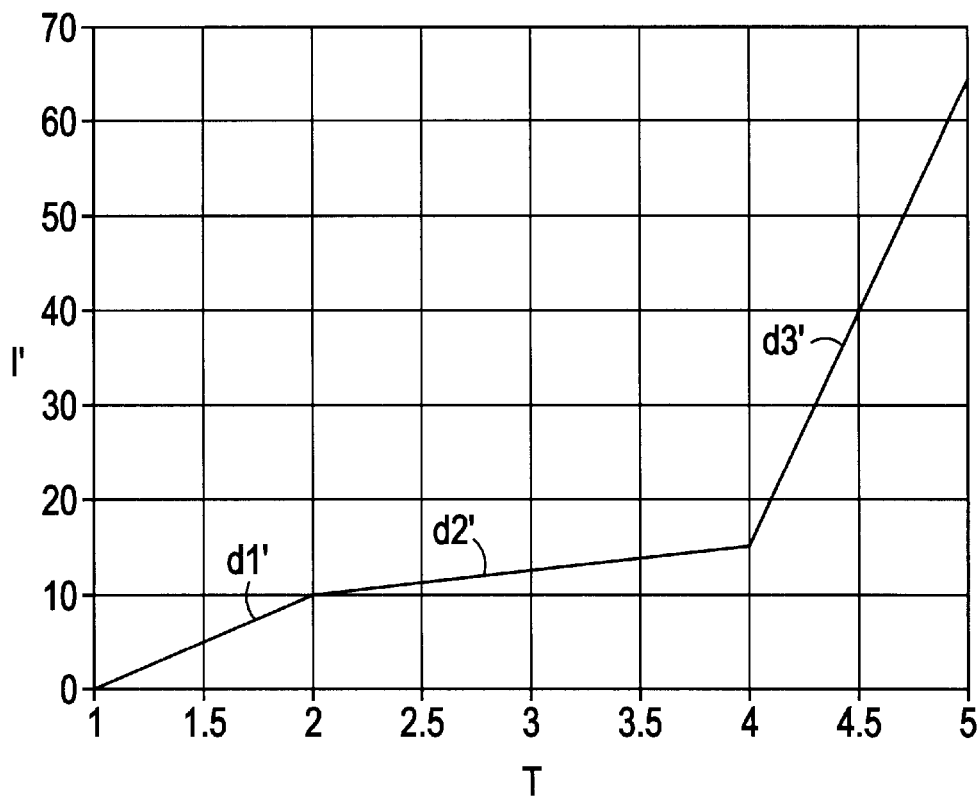
FIG. 32 is a characteristic drawing that explains the present invention.

Here, the characteristic curves of the one-step differentiations d1', d2', d3' are indicated in FIG. 32. Here, of course, at the connecting points(b2, b3)=(x=2, x=4), the one-step differentiations are continuous. In other words, not only the steering assist instruction value I corresponding to the detection value of the steering torque T is continuous, but also at least the rate of change(one-step differentiation) is continuous; therefore, in comparison with a conventional method in which a plurality of quadratic or more functions are simply connected, it is possible to achieve a control device of a steering apparatus which can provide a far more desirable, smoother sense of steering.

The present invention is characterized by the steering assist instruction value calculating unit in a control device of an electric power steering apparatus, and with respect to control devices other than the steering assist instruction value calculating unit, the applicant of the present invention has already proposed those apparatuses(see Japanese Patent Application Laid-open No. 10-59203 A), and the detailed explanation thereof will be omitted, since they are not included in the objects of the present invention.

As described above, in the control device for the electric power steering apparatus, a steering assist instruction value corresponding to the steering torque is generated by an operation means by which approximations are made to functions having at least one-step derived functions are continuous (thereby ensuring linear continuity) so that, based upon the approximation functions, the operation means carries out operations to provide a steering assist instruction value corresponding to the detection value, and preferably the approximation functions are provided as not less than quadratic spline functions, more preferably quadratic spline functions. For this reason, different from a case in which the steering assist instruction value corresponding—to the detection value of the steering torque is stored, it is not necessary to provide a large amount of memory, and different from a case in which steering assist instruction values corresponding to the detection values of the steering torque are simply connected as polynomials, it is possible to obtain an appropriate steering assist instruction value corresponding to the steering torque without causing degradation in the sense of steering due to discontinuity of the one-step differentiations; thus, it becomes possible to provide an electric power steering apparatus which has a smooth sense of steering to a great degree.

What is claimed is:

1. A control device, of an electric power steering system, for controlling a motor for applying a steering assist force to a steering mechanism, the control device comprising:

a steering assist command value operating section comprising a means for calculating a steering assist command value, based on: a steering torque generated in a steering shaft; and an approximation functional expression, which is stored in said steering assist command value operating section, wherein said approximation functional expression is one in which a one-step derived function is continuous; and a current control section comprising a means for calculating a current control value, based on: a current value of the motor for applying a steering assist force to a steering mechanism; said steering assist command value; and a gain curve, which at least partially possess a gradient exceeding a predetermined value.

2. A control device for an electric power steering apparatus according to claim 1, wherein said predetermined value is set to 10 db/dec.

3. A control device for an electric power steering apparatus according to claim 1, wherein said approximation functional expression is a spline function.

4. A control device for an electric power steering apparatus according to claim 3, wherein said spline function is a quadratic spline function.

5. A control device for an electric power steering apparatus according to claim 3, wherein said spline function is a tertiary spline function.

6. A control device for an electric power steering apparatus according to claim 3, wherein said approximation functional expression is a polynomial in accordance with Lagrange's formula.

\* \* \* \* \*